United States Patent
Ahirwar et al.

(10) Patent No.: US 12,461,863 B2
(45) Date of Patent: *Nov. 4, 2025

(54) METHOD AND DEVICE FOR FACILITATING SECURE DATA TRANSFER AND STORAGE

(71) Applicant: Sandisk Technologies, Inc., Milpitas, CA (US)

(72) Inventors: Rewa Prasad Ahirwar, Bangalore (IN); Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 18/447,781

(22) Filed: Aug. 10, 2023

(65) Prior Publication Data
US 2025/0004952 A1 Jan. 2, 2025

Related U.S. Application Data

(60) Provisional application No. 63/523,891, filed on Jun. 28, 2023.

(51) Int. Cl.
*G06F 12/14* (2006.01)
*H04L 9/32* (2006.01)
*H04W 12/062* (2021.01)

(52) U.S. Cl.
CPC ........ *G06F 12/1458* (2013.01); *H04L 9/3215* (2013.01); *H04L 9/3234* (2013.01); *H04W 12/062* (2021.01); *G06F 2212/1052* (2013.01)

(58) Field of Classification Search
None
See application file for complete search history.

(56) References Cited

U.S. PATENT DOCUMENTS

| 8,639,873 B1 | 1/2014 | Jevans |
| 10,348,695 B1 | 7/2019 | Khassanov |

(Continued)

FOREIGN PATENT DOCUMENTS

| CN | 105739906 A | 7/2016 |
| KR | 20240063736 A | 5/2024 |

OTHER PUBLICATIONS

"ArmorLock™ Security Platform", Western Digital Corporation, pp. 1-18, (2020).

(Continued)

*Primary Examiner* — Kaushikkumar M Patel
(74) *Attorney, Agent, or Firm* — Patent Law Works LLP

(57) ABSTRACT

A computer implemented method for transferring data from a user device to a non-volatile storage medium of a data storage device via a wireless peer-to-peer communication channel. The method executing on a user device comprising a user interface and memory store. The method comprises establishing a wireless peer-to-peer control channel between the user device and the data storage device. In response to receiving, via the user interface, a request to transfer data from the user device to the storage medium, sending, to the data storage device, via the control channel, a command to enable control channel access, and performing a secure unlocking process to transition the data storage device to a control channel access state. In response to successfully completing the secure unlocking process, obtaining write data, and sending, to the data storage device, via the control channel, a write command comprising the write data.

20 Claims, 11 Drawing Sheets

(56) References Cited

U.S. PATENT DOCUMENTS

| | | | |
|---|---|---|---|
| 11,556,665 B2 | 1/2023 | Mastenbrook et al. | |
| 2006/0039221 A1 | 2/2006 | Fukuda | |
| 2010/0268878 A1 | 10/2010 | Matton | |
| 2012/0246416 A1 | 9/2012 | Shiba | |
| 2014/0295754 A1* | 10/2014 | Lortz | H04B 5/72 |
| | | | 455/41.1 |
| 2015/0171928 A1 | 6/2015 | Lee | |
| 2015/0199684 A1 | 7/2015 | Maus | |
| 2016/0028713 A1 | 1/2016 | Chui | |
| 2019/0026727 A1 | 1/2019 | Wilson | |
| 2019/0377505 A1 | 12/2019 | Yaghmour | |
| 2021/0173561 A1* | 6/2021 | Mastenbrook | G06F 3/0622 |
| 2021/0218557 A1* | 7/2021 | Mastenbrook | H04L 9/3271 |
| 2022/0014918 A1* | 1/2022 | Mastenbrook | H04W 12/041 |
| 2022/0035901 A1 | 2/2022 | Yun | |
| 2022/0221990 A1* | 7/2022 | Srimal | G06F 3/067 |

OTHER PUBLICATIONS

"ArmorLock™ Encrypted NVMe™ SSD with Mobile and Desktop Apps User Manual", Western Digital Corporation, pp. 1-37, (2022).

Translation of CN-105739906-A. 2024.

Translation of KR-20240063736-A. 2024.

"ArmorLock User Manual: Encrypted NVMe SSD with Mobile and Desktop Apps". https://documents.westerndigital.com/content/dam/doc-library/en_us/assets/public/sandisk-pro/product/portable-drives/armorlock/user-manual-armorlock.pdf (2022)—Accessed Dec. 13, 2022.

"Western Digital Whitepaper ArmorLock Security Platform". https://documents.westerndigital.com/content/dam/doc-library/en_us/assets/public/western-digital/collateral/white-paper/white-paper-armorlock-security-platform.pdf, (Sep. 2020).—Accessed Dec. 13, 2022.

* cited by examiner

METHOD AND DEVICE FOR FACILITATING SECURE DATA TRANSFER AND STORAGE

TECHNICAL FIELD

Aspects of the disclosure relate generally to data storage device hardware and user devices and, more specifically, to systems and methods for transferring data between a data storage device and a user device.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the system. From the perspective of the computing system, a DSD is typically implemented as a block storage device where the data stored is in the form of one or more blocks, being sequences of bytes or bits having a maximum length, referred to as block size.

External DSDs are commonly used to supplement the data storage capabilities of a computer system. For example, external DSDs are often standalone physical devices which house an internal storage component, such as a hard disk drive (HDD) or a solid state drive (SSD), that provides a host computing system with an additional portion of non-volatile memory (i.e., the volume of the drive) in which to store digital data. These external drive type devices are connectable to the host computer system via a data path operating over a particular connectivity protocol (e.g., via Universal Serial Bus (USB) cable). In response to being connected to the host computer system, the host computer system recognizes the external drive as a block data storage device such that a user of the device may access the storage of the drive via the data path (e.g., through operation of the host computer). Access to the drive typically enables a user to access (e.g., read, write and/or modify) user data stored on the drive.

A user may use a DSD to store data that is proprietary, confidential, important or otherwise sensitive. Situations may arise in which it is difficult, undesirable or not possible to transfer data to a data storage device from a host computer system. Accordingly, it is desirable to provide the user with an alternative means to securely and privately transfer data to the data storage device.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY

In accordance with an aspect of the present disclosure, there is provided a data storage device comprising a data port, configured to transceive data via a wired communication channel, between a host computer system and the data storage device, and a control port, configured to transceive data via a peer-to-peer wireless communication channel, between a user device and the data storage device. The data storage device further comprises a non-volatile storage medium, configured to store user content data, and a controller. The controller is configured to, in response to receiving, from the user device, via the control port, a command to enable control channel access, perform an unlocking process, and in response to completing the unlocking process, transition from a locked state to a control channel access state. The controller is configured to, in response to being in the control channel access state, and in response to receiving, from the user device, via the control port, a write command, the write command comprising write data, store the write data in the non-volatile storage medium. The controller is configured to, in response to being in the control channel access state, and in response to receiving, from the host computer, via the data port, a command to access the storage medium, transmit, to the host computer, via the data port, a locked state indication.

In some embodiments, the unlocking process comprises: generating, by the controller, a challenge for the user device; transmitting, to the user device, via the wireless communication channel, the challenge; and receiving, from the user device, via the wireless communication channel, a response calculated by the user device based on the challenge. In some embodiments, the challenge is based on elliptic curve cryptography.

In some embodiments, the locked state indication comprises an indication that there is no storage medium present in the data storage device. In some embodiments, the command to access the storage medium comprises one or more of: a read command; a write command; and a register command.

In some embodiments, in response to being in the control channel access state, the controller is further configured to, in response to receiving, from the user device, via the control port, a read command, the read command comprising an indication of a read data stored in the storage medium, transmit the read data, via the control port, to the user device.

In some embodiments, the controller is further configured to, in response to receiving, from the user device, via the control port, a command to transition to the unlocked state, perform an unlocking process, and, in response to completing the unlocking process, transition to an unlocked state.

In some embodiments, in response to being in the control channel access state, the controller is further configured to, in response to receiving, from the authorized device, an indication to cease control channel access, transition to the unlocked state.

In some embodiments, the data storage device is further configured to, in response to being in a locked state, register with the host computer system as a mass data storage device without a storage medium present. In some embodiments, the data storage device is further configured to, in response to being in the control channel access state, register with the host computer system as a mass data storage device without a storage medium present. In some embodiments, the data storage device is further configured to, in response to being in the unlocked state, register with the host computer system as a mass data storage device with a storage medium present.

In some embodiments, the data storage device is further configured to, in response to being in the unlocked state, and in response to receiving, from the host computer system, via the data port, a read command, the read command comprising an indication of read data stored in the storage medium: transmit the read data, via the data port, to the host computer system; and in response to receiving, from the host computer system, via the data port, a write command, the write command comprising write data, store the write data in the non-volatile storage medium.

In some embodiments, the data storage device is further configured to, responsive to being in the control channel access state, register with the user device as a mass data storage device with a storage medium present.

In some embodiments, the data storage device further comprises a cryptography engine, connected between the data port and the storage medium and configured to use a cryptographic key to decrypt the encrypted user content data stored on the storage medium. In some embodiments, the unlocking process further comprises calculating the cryptographic key based at least partly on the response, and providing the cryptographic key to the cryptography engine to decrypt the user content data stored on the storage medium of the data storage device.

In some embodiments, in response to being in an unlocked state, the controller is configured to cause the cryptography engine to use the cryptographic key to decrypt the encrypted user content data stored on the storage medium in response to a read command, receive via the data port, from the host computer system. In some embodiments, in response to being in a control channel access state, the controller is configured to cause the cryptography engine to use the cryptographic key to decrypt the encrypted user content data stored on the storage medium in response to a read command, received via the control port, from the user device.

In some embodiments, the peer-to-peer wireless communication channel comprises a Bluetooth communication channel. In some embodiments, the controller is further configured to establish the peer-to-peer wireless communication channel by performing a pairing process with the user device. In some embodiments, the user device comprises an authorized user device.

In accordance with another aspect, there is provided a method for accessing data on a data storage device. The method may be performed by a controller of a data storage device. The method comprises, in response to receiving, from a user device, via a control port, a command to enable control channel access, performing an unlocking process. The method further comprises, in response to completing the unlocking process, transition from a locked state to a control channel access state. The method further comprises, in response to being in the control channel access state and, in response to receiving, from the user device, via the control port, a write command, the write command comprising write data, storing the write data in a non-volatile storage medium of the data storage device, and in response to receiving, from a host computer, via a data port, a command to access the storage medium, transmitting, to the host computer, via the data port, a locked state indication.

In accordance with another aspect, there is provided a data storage device comprising means for, in response to receiving, from a user device, via a control port, a command to enable control channel access, performing an unlocking process. The data storage device further comprises means for, in response to completing the unlocking process, transition from a locked state to a control channel access state. The data storage device further comprises means for, in response to being in the control channel access state, in response to receiving, from the user device, via the control port, a write command, the write command comprising write data, storing the write data in a non-volatile storage medium of the data storage device, and in response to receiving, from a host computer, via a data port, a command to access the storage medium, transmitting, to the host computer, via the data port, a locked state indication.

In accordance with another aspect, there is provided a computer implemented method for transferring data from a user device to a non-volatile storage medium of a data storage device via a wireless peer-to-peer communication channel. The method may be performed by a software application executing on a user device. The user device comprises a user interface and memory store. The method comprises establishing a control channel between the user device and the data storage device, the control channel comprising a wireless peer-to-peer communication channel. The method further comprises, in response to receiving from a user, via the user interface, a request to transfer data from the user device to the storage medium of the data storage device, sending, to the data storage device, via the control channel, a command to enable control channel access, performing a secure unlocking process to transition the data storage device to a control channel access state, and, in response to successfully completing the secure unlocking process, obtaining write data to be written to the storage medium, and sending, to the data storage device, via the control channel, a write command comprising the write data.

In some embodiments, the software application comprises an operating system of the user device, and the method further comprises registering the data storage device as a block storage device with the operating system of the user device.

In some embodiments, the method further comprises establishing a peripheral control channel between the user device and a peripheral device, the peripheral control channel comprising a wireless peer-to-peer communication channel, and receiving, from the peripheral device, via the peripheral control channel, the write data. In some embodiments, the software application comprises a peripheral device application configured to communicate with the peripheral device, via the peripheral control channel.

In some embodiments, obtaining write data to be written to the storage medium comprises receiving, by the peripheral device application, from the peripheral device, via the peripheral control channel, the write data. In some embodiments, the peripheral device application is configured to store a copy of the write data in the memory store of the user device. In some embodiments, the peripheral device application is configured to, in response to sending, to the data storage device, via the control channel, a write command comprising the write data, erase the copy of the write data from the memory store of the user device.

In some embodiments, the request to transfer data comprises a request to transfer data from a second data storage device to the first data storage device. In some embodiments, the data storage device comprises a first data storage device and the control channel comprises a first control channel. In some embodiments, the method further comprises establishing a second control channel between the user device and a second data storage device, the second control channel comprising a wireless peer-to-peer communication channel. In some embodiments, the method further comprises sending, to the second data storage device, via the control channel, a command to enable control channel access. In some embodiments, the method further comprises performing a secure unlocking process to transition the second data storage device to a control channel access state, and, in response to successfully completing the secure unlocking process, send, to the second data storage device, via the control channel, a read command, the read command comprising a reference to read data stored in a storage medium of the second data storage device, and receiving, from the second data storage device, via the control channel, the read data.

In some embodiments, the method further comprises writing the read data, to a memory store of the user device, as the write data. In some embodiments, the method further comprises, in response to sending, to the data storage device, via the control channel, a write command comprising the write data, erase the write data from the memory store of the user device.

In some embodiments, the method further comprises obtaining, from the first data storage device, an indication of a first file structure, the first file structure comprising zero or more files, and obtaining, from the second data storage device, an indication of a second file structure, the second file structure comprising at least one file. In some embodiments, the method further comprises displaying, on the user interface of the user device, a representation of the first file structure and a representation of the second file structure.

In some embodiments, the obtaining write data to be written to the storage medium comprises, receiving, via the user interface, a user selection of a selected file in the second file structure, and sending, to the second data storage device, via the control channel, a read command, the read command comprising a reference to the selected file, and receiving, from the second data storage device, via the control channel, the selected file. In some embodiments, the write data comprises one or more files.

In some embodiments, the unlocking process comprises receiving, from the data storage device, via the control channel, a cryptographic challenge, determining a response to the cryptographic challenge, and transmitting, to the user device, via the control channel, the challenge. In some embodiments, the challenge is based on elliptic curve cryptography.

In accordance with another aspect, there is provided a device for transferring data to a non-volatile storage medium of a data storage device via a wireless peer-to-peer communication channel. The device comprises a user interface, a memory store, and one or more processors. The processors are configured to establish a control channel between the device and the data storage device, the control channel comprising a wireless peer-to-peer communication channel, and, in response to receiving from a user, via the user interface, a request to transfer data from the device to a storage medium of the data storage device, send, to the data storage device, via the control channel, a command to enable control channel access. The processors are further configured to perform a secure unlocking process to transition the data storage device to a control channel access state, and in response to successfully completing the secure unlocking process, obtain write data to be written to the storage medium, and send, to the data storage device, via the control channel, a write command comprising the write data.

In accordance with another aspect, there is provided a device for transferring data to a non-volatile storage medium of a data storage device via a wireless peer-to-peer communication channel. The device comprises means to establish a control channel between the device and the data storage device, the control channel comprising a wireless peer-to-peer communication channel. The device further comprises means to, in response to receiving from a user, via the user interface, a request to transfer data from the device to a storage medium of the data storage device, send, to the data storage device, via the control channel, a command to enable control channel access, and perform a secure unlocking process to transition the data storage device to a control channel access state. The device further comprises means to, in response to successfully completing the secure unlocking process, obtain write data to be written to the storage medium, and send, to the data storage device, via the control channel, a write command comprising the write data.

BRIEF DESCRIPTION OF DRAWINGS

The embodiments of the disclosure will now be described with reference to the accompanying drawings, in which.

DETAILED DESCRIPTION

Figure 1:
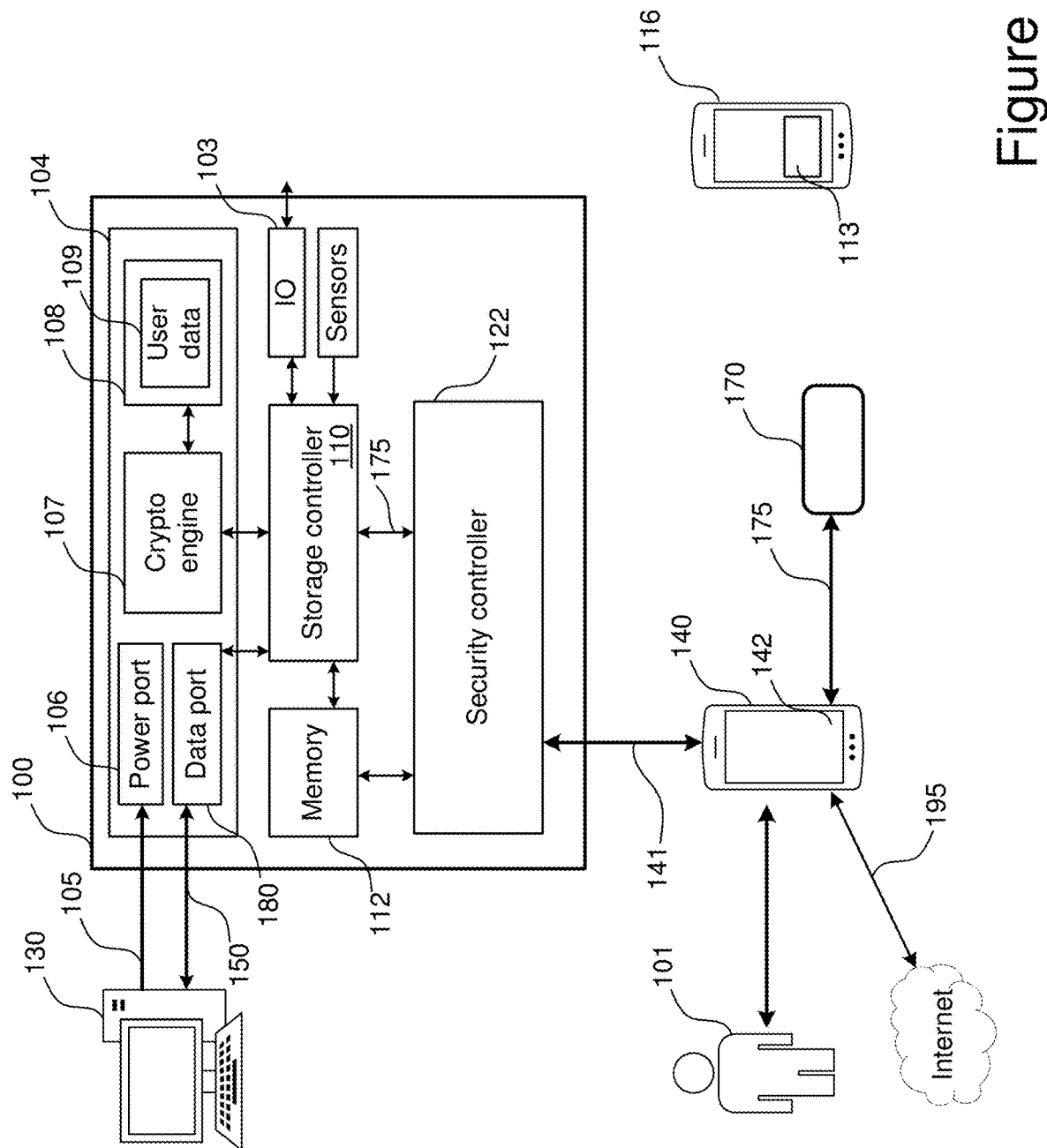
FIG. 1 is a block diagram illustrating a data storage device and an authorized user device, in accordance with an embodiment.

Data storage devices described herein provide an improved solution for transferring data between a user device and the data storage device without reliance on a host computer. In particular, the data storage devices described herein comprise the means to send and receive data to a user device via a wireless peer-to-peer communication channel.

User devices described herein provide an improved solution for transferring data from a peripheral device, in communication with the user device, to a data storage device, without reliance on a host computer system. Furthermore, user devices described herein provide an improved solution for transferring data from one data storage device, to another data storage device, via the user device, without reliance on a host computer system.

It is an advantage of the described embodiments that secure data transfers between the user device and the data storage device may occur without use of a host computer system. Furthermore, it is an advantage of the described embodiments that secure data transfers between the user device and the data storage device may occur without use of a router, server or other intermediate entity.

Data storage devices (DSDs) described herein are configured to register with a host computer system as a block data storage device. The DSDs described herein comprise a wired data port, configured to connect to a host computer system via a wired communication channel, such as a USB port. For security and control, the DSDs described herein also comprise a wireless control port, configured to communicate wireless, e.g., via Bluetooth, with a user device.

Data transfer to and from a DSD occurs via the wired data port and via the host computer system. For example, if a user desires to transfer data from a first DSD to a second DSD, the user may have to connect both DSDs to a USB port of the host computer system. Either connect both DSDs simultaneously to two different USB ports, and transfer the data from the first DSD to the second DSD via the host computer system. Alternatively, the user could connect the first DSD to the USB port of host computer system, transfer the data from the first DSD onto the host computer system, disconnect the first DSD from the USB port, connect the second DSD to the USB port, and transfer the data from the host computer system to the second DSD.

There may be situations in which there is an insufficient number of available USB ports on the host computer system to achieve the desired data transfer. Similarly, there may be situations in which using a host computer system to facilitate the data transfer is not possible or not desirable.

Wireless data transfers from one data storage device to another data storage devices may be possible via wireless communication protocols such as WiFi. However, such protocols utilise routers and servers through which the transferred data is routed. In situations where the routers or servers are unavailable, the use of such wireless protocols may be undesirable.

Additionally, it may be desirable to securely and privately store data, generated by a user device, or a peripheral device connected thereto. For example, it may be desirable to securely and privately store data generated by a health and fitness device wirelessly connected to a user device.

It may be possible for the user device to wirelessly store the generated data on a remote server (e.g., a cloud server) via the internet. However, for privacy reasons a user may prefer not to store the generated data on a remote server. Furthermore, in situations where the user device does not have internet access, it may be desirable to store the generated data on a local data storage device.

Provided herein is a data storage device which may be securely unlocked for data access, via a control channel, comprising a wireless peer-to-peer communication channel, between an authorized user device and the data storage device. Furthermore, provided herein is a data storage device which is configured to transfer data between the user device and the data storage device, via the wireless peer-to-peer control channel.

An application on the user device securely connects to the data storage device over the wireless peer-to-peer communication channel and exposes the data storage device as an external data storage space to applications executing on the user device.

Data transferred to the data storage device from the user device may comprise data generated on the user device; data obtained from peripheral devices wirelessly connected to the user device; and/or data wirelessly obtained from another data storage device.

Data Storage Device

FIG. 1 illustrates a data storage device (DSD) 100, in accordance with an embodiment. The DSD 100 comprises a data path 104 and a storage controller 110. The data path 104 comprises a data port 180 configured to transceiver (e.g., transmit, or receive, or both) data between a host computer system 130 and the DSD 100. The DSD 100 is configured to register with the host computer system 130 such as to provide functionality to the host computer system 130 of a mass storage device (e.g., a block data storage device).

DSD 100 further comprises storage medium 108 configured to store user content data 109. The user content data 109 comprises one or more blocks of data organized into one or more user files, in accordance with a particular file system operable by the host computer system 130. In examples, the user files may comprise images, documents, videos etc.

The storage medium 108 is non-volatile such as to retain the stored user content data irrespective of whether the medium 108 is powered. In embodiments, the medium 108 may comprise, a hard disk drive (HDD) with a rotating magnetic disk, a solid state drive (SSD) or its variations like SLC (Single Level Cell), eMLC (Enterprise Multi Level Cell), MLC (Multi Level Cell), TLC (Triple Level Cell), and QLC (Quadruple Level Cell), and combinations of the above such as SSHD. Any other type of non-volatile storage media may also be used, including emerging non-volatile memory such as Program in Place or Storage Class Memory, such as ReRam, Phase Change Memory (PCM), and magnetoresistive random-access memory (MRAM). Further, the storage medium 108 may be a block data storage device, such that the user content data 109 is written in blocks to the storage medium 108 and read in blocks from the storage medium 108.

The storage medium 108 may be further configured to store application data, which is used by the storage controller 110. For example, application data may comprise software instructions that are executable by the controller, log files, configuration parameters and other data not intended for use by a user.

Host Computer System

The host computer system 130 comprises one or more processing components. In one embodiment, the host computer system 130 comprises a personal computer, such as a desktop computer or a laptop computer. The host computer system 130 comprises a device driver which is configured to communicate with the DSD 100 over wired communication channel 150. The DSD 100 is configured to receive and transmit data to the host computer system 130, over wired communication channel 150, via data port 180. Accordingly, wired communication channel 150 may be referred to as data channel 150, as this channel supports the transfer of user data between the host computer and the DSD.

Power Interface

In the embodiment illustrated in FIG. 1, the DSD 100 further comprises a power port 106 which is configured to receive electrical power via power interface 105. The power interface 105 may be electrically connected to the host computer system 130, such that the host computer system 130 is a power source and the power port 106 receives power from the host computer system. In another embodiment, the power interface 105 is electrically connected to a component other than the host computer system 130. The power interface 105 may comprise a wired electrical connection to a power source. The power interface 105 may comprise a wireless electrical connection to a power source.

The power port 106 and the data port 180 may be implemented collectively as, for example, some form of USB port (e.g., USB-A, USB-8, USB-C, mini-USB, micro-USB, etc.), a Thunderbolt port, a Power over Ethernet (POE) port, or a similar port. In one embodiment, the power interface 105 comprises a USB interface which is configured to supply typically 5 V at 500 mA or higher currents.

In one embodiment, the power interface 105 comprises a wireless charging interface. The wireless charging interface may utilize electromagnetic induction to provide electrical power to the DSD 100. In one embodiment, the power interface 105 electrically connects the DSD 100 to the host computer system 130. In another embodiment, the power interface 105 electrically connects the DSD 100 to a power source that is not part of the host computer system 130.

In one embodiment, the DSD 100 consumes power from the power interface 105 to operate the electronic circuitry of the DSD 100.

User and User Device

FIG. 1 further illustrates a user 101 of the DSD 100. The user 101 utilizes a user device 140, which may comprise a mobile phone, laptop, personal computer, or other device capable of communication with the DSD 100 via communication channel 141. The user device 140 and user 101 may be authorized to control the operation of the DSD 100. In such case, the user device 140 is referred to as an authorized user device 140.

In the example illustrated in FIG. 1, the user device 140 is controlled by software 142 which is configured to execute on one or more processors of the user device to implement the operations described as being performed by the user device.

Storage Controller

The DSD 100 further comprises a storage controller 110. The storage controller 110 may be comprised of one or more processors, microprocessors, microcontrollers or controlling circuitry. The storage controller 110 is configured to execute program code stored within the system memory 112 to issue commands for controlling the operation of the DSD 100.

The system memory 112 stores device specific data, including at least a unique identifier of the DSD 100, referred to as the device identity key (IDK). The system memory 112 may further store configuration information which defines the function of the DSD 100. The DSD 100 may receive configuration information from the user 101 via the user device 140, and store the configuration information in the system memory 112.

The function of the storage controller 110 includes, but is not limited to, controlling data transmission through data path 104, and controlling operation of the cryptography engine to direct the encryption or decryption of the user content data 109 by cryptography engine 107.

Security Controller

The DSD 100 further comprises a security controller 122. The security controller may be comprised of one or more processors, microprocessors, microcontrollers or controlling circuitry. The security controller is configured to execute program code stored within the system memory 112 to liaise with one or more authorized user devices, as a control port, via the wireless communication channel 141, and to issue commands to the storage controller 110 for controlling the security operations of the DSD 100.

The storage controller 110 and the security controller 122 communicate via a bi-directional communication channel, referred to as side channel 270. Via side channel 270, the security controller provides commands to the storage controller to control the operational state of the DSD 100. Collectively, the storage controller 110 and the security controller 122 may be referred to as the controller 120.

Cryptography Engine

The DSD 100 includes a cryptography engine 107 configured to receive, interpret and execute commands received from host computer system 104 in accordance with a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI) and other proprietary architectures.

The cryptography engine 107 is connected between the storage controller 110 and the storage medium 108 and is configured to use a cryptographic key to encrypt user content data 109 to be stored on the storage medium 108, and to decrypt the encrypted user content data 109 stored on the storage medium 108 in response to a request from the storage controller. The storage controller causes the cryptography engine 107 to control a cryptographic state of the user content data 109 (i.e., encrypted or plain). In one mode of operation, the unencrypted data may pass through the data path 104 to the host computer system 130 via the data port 180.

IO Interface

The data storage device 100 may include an input/output (IO) interface 103. The IO interface 103 may include one or more input components configured to accept an input from the user 101. For example, the input components may include a set of buttons or a keypad, or a similar arrangement of mechanical components that collectively enable the selection of digits or characters for entering into the device 100. The input components may also include one or more communications devices, such as a wireless modem, configured to receive and transmit data wirelessly via the transmission of an electronic message in a predetermined form.

The IO interface 103 may include one or more output components configured to indicate information to the user 101. For example, the output components may include a speaker, configured to emit audible signals, one or more visual indicators, such as a light or a display, configured to emit visual signals.

In one embodiment, the visual indicators include at least one operational state indicator configured provide the user 101 with an indication of whether the DSD is in a locked state, and unlocked state, or a control channel (CC) access state, as described further herein.

DSD Enclosure

The DSD 100 includes an enclosure configured to physically house the components of the device 100. The enclosure is formed from a rigid, or semi-rigid, material with particular properties (e.g., electrical resistance and impact strength)

suited to protecting the internal components of device 100. For example, the material of the enclosure may include a polycarbonate (PC), an acrylonitrile butadiene styrene (ABS), an acrylic, a thermoplastic polyester, a metal, or a combination of any of these.

Wireless Communication Channel

The DSD 100 is communicatively connected to the user device 140 via communication channel 141. Communication channel 141 may comprise a wireless peer-to-peer communication channel configured to provide bi-directional communication directly between the user device 140 and the DSD 100 in accordance with a protocol, such as, but not limited to: Bluetooth; Bluetooth Low Energy (BLE); Zigbee; WiFi Direct; Z-Wave; Global System for Mobile communication (GSM), Long-Term Evolution (LTE); Narrowband Internet of Things (NB-IoT); Long-Term Evolution Machine type communication (LTE-M); or a Low-Power Wide-Area Network (LPWAN) protocol such as 6LoWPAN.

In embodiments, the communication channel 141 comprises a control channel 141, configured to transmit control signals from the authorized user device 140 and the DSD 100.

The user device may be communicatively coupled to remote servers and routers via wireless communication channel 195. However, the control channel 141 comprises a direct peer-to-peer communication channel. Advantageously, as the control channel 141 provides direct peer-to-peer wireless communication, communication via the control channel 141 is not dependent upon a router to transmit communication between the DSD 100 and the user device 140. Accordingly, it is not necessary to route communication from the authorized user device 140 to the DSD 100 via the internet, or via a router.

In the example illustrated in FIG. 1, the authorized user device 140 is a smart phone, and the control channel 141 is a Bluetooth connection. The user device 140 and the DSD 100 establish the communication channel 141 by pairing through the establishment of a Bluetooth connection. The Bluetooth connection forms a control channel 141 via which the authorized user device 140 and the DSD 100 can communicate.

Advantageously, embodiments described herein provide means for the user device to transfer data via the wireless peer-to-peer control channel 141 to be stored in the storage medium 108 of the DSD.

Taking Ownership

In some embodiments, the first step in using DSD 100 after purchase, unpacking and power-up is to install the DSD on a manager device 116 and register a device as the manager device 116. For this process, the manager device 116 obtains a unique identifier of the DSD from the DSD. This unique identifier is referred to as the identity key (IDK). The identity key may be encoded in a quick response (QR) code affixed to an external surface of the DSD 100. A DSD controller application installed on manager device 116 has access to a camera and has a software module that extracts the encoded information from an image of the QR code. The manager device 116 captures an image of the QR code using the camera, and decodes the identity key of DSD 100 from the QR code. In one example, the QR code encodes a Uniform Resource Locator (URL). In that case, a generic app can capture the QR code, which then automatically directs the phone to an application store where the app can be downloaded. The URL also includes the identity key so that the app can decode that identifier once the app is installed.

In another example, manager device 116 may read another tag or near field communication (NFC) chip affixed or integrated with DSD 100 to obtain the identity key. Using that identity key, the manager device 116 can then initiate a communication, such as wirelessly (e.g., over Bluetooth), with the DSD 100 and, in particular, with the security controller 122.

Registration of Authorized User Device

Once the DSD 100 is initially configured during the take ownership process, manager device 116 registers the authorized user device 140. There may be multiple authorized user devices registered with a single DSD 100, so manager device 116 registers the authorized user device as one of multiple authorized user devices. More particularly, security controller 122 receives from the manager device 116, over a wireless communication channel, a public key associated with a private key stored on user device 140. The manager device 116 itself may have received the public key from the user device 140 via email, by scanning a QR code displayed on the user device 140 or any other way. At this point in time, device 140 is not yet authorized and therefore, simply referred to as "user device 140". Once user device 140 is authorized, it is referred to as "authorized user device 140".

Security controller 122 creates authorization data that indicates that user device 140 is an authorized user device and stores the authorization data associated with the public key in configuration memory 112 to register the user device 140 as one of the multiple authorized user devices. This means keys and other data associated with authorized user device 140 are created and stored as described below. A user can then use the authorized user device 140 to unlock the DSD 100 simply by bringing the authorized user device 140 into wireless communication range, such as within Bluetooth range. Again, the steps performed by authorized user device 140 are encoded in an application installed on authorized user device 140. Depending on configuration parameters, the user may be required to unlock the authorized user device 140 before DSD 100 can be unlocked.

More particularly, security controller 122 has access to a non-volatile configuration data store, such as configuration memory 112, which may be a flash memory that is external to the security controller 122 (but may equally be integrated into security controller 122). Configuration memory 115 may also store the program code that implements the steps described herein as being executed by security controller 122. It is noted that some examples herein are configured under the assumption that an attacker can readily unsolder and read out the content of the configuration memory 115 but should not be able to decrypt the user content data with that information. That is, in those examples, no keys are stored persistently in plain text on configuration memory 115 or elsewhere in DSD 100 on non-volatile memory.

Once the cryptographic keys are available in plain text, they are stored only in volatile memory (not shown). This means that a power-down of the DSD 100 erases all cryptographic keys stored in plain text. Additional circuitry may be provided to reset all remaining charges on power-down, power-up or external reset, so that it is physically impossible in practice to recover any information from volatile memory. In many cases, power-down and erasure of all volatile memory occurs as a result of the user disconnecting the USB cable from the host computer system 104. In other examples, a secondary power supply is used which needs to be disconnected to power down the DSD 100 to delete the volatile memory.

Remote Peripheral Device

In embodiments, the user device 140 is communicatively coupled to a remote peripheral device 170 via a communication channel, referred to as peripheral communication channel 175. The peripheral communication channel may comprise a wired or a wireless communication channel.

The peripheral communication channel may comprise a wireless peer-to-peer communication channel configured to provide bi-directional communication directly between the user device 140 and the peripheral device 170 in accordance with a protocol, such as, but not limited to: Bluetooth; Bluetooth Low Energy (BLE); Zigbee; WiFi Direct; Z-Wave; Global System for Mobile communication (GSM), Long-Term Evolution (LTE); Narrowband Internet of Things (NB-IoT); Long-Term Evolution Machine type communication (LTE-M); or a Low-Power Wide-Area Network (LPWAN) protocol such as 6LoWPAN.

In the embodiment illustrated in FIG. 1, peripheral communication channel 175 comprises a wireless communication channel configured to provide communication in accordance with the Bluetooth protocol.

In embodiments, the peripheral device 170 is configured to transmit data to the user device 140. In embodiments, the peripheral device 170 may comprise a wireless communication enabled device configured to sense data and communicate the sensed data to the user device 140. The peripheral device 170 may comprise a device such as, but not limited to: a smart watch; a pedometer; a health & fitness monitor; an environmental parameter sensing device; or another type of sensing device.

Detailed Architecture

Figure 2:
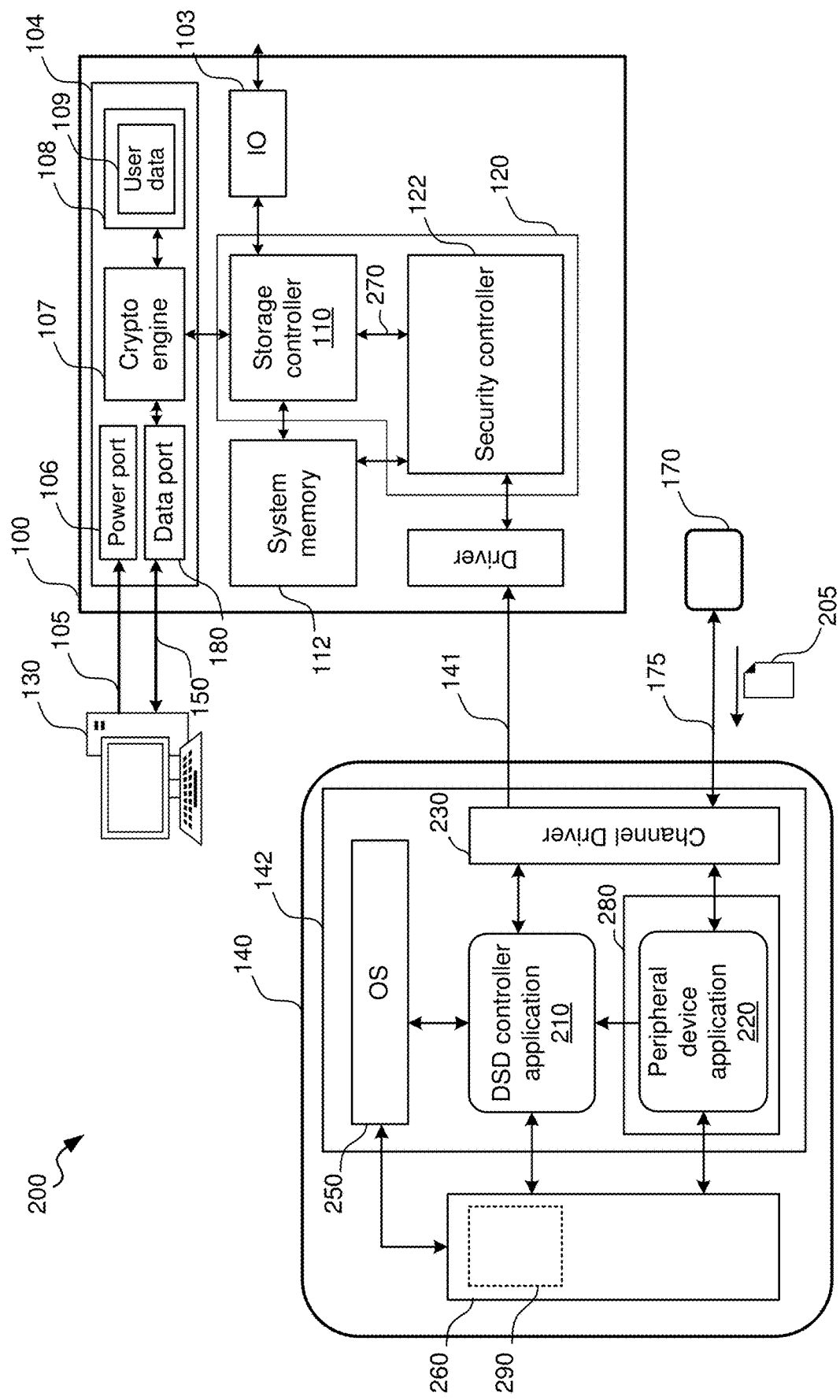
FIG. 2 is a block diagram illustrating the system architecture of the data storage device and the authorized user device of FIG. 1 in further detail, in accordance with an embodiment.

FIG. 2 is a block diagram illustrating the system architecture of the DSD 100 and the authorized user device 140 of FIG. 1 in further detail, in accordance with an embodiment.

User Device Software

The user device 140 is controlled by software 142 that is configured to execute on one or more processors of the user device to implement the operations described as being performed by the user device. The software 142 may comprise a plurality of software applications configured to execute on the user device. It will be appreciated that in embodiments in which the user device comprises a mobile phone, the software 142 may comprise an operating system and a large number of applications installed on the user device.

In one embodiment, the software 142 comprises a DSD controller application (DSD App) 210. The DSD App is configured to provide the user 101 with control of the operation of the DSD 100. The user 101 may use DSD App, via a user interface of the user device 140, to control the operation of the DSD 100.

The software may further comprise one or more applications 280, installed on the user device 140. The applications 280 may comprise a peripheral device application 220, which is configured to communicate with the peripheral device 170 via the peripheral communication channel 175. In embodiments, the peripheral device application 220 may be configured to control the functionality of the peripheral device; receive data from the peripheral device via the peripheral communication channel; and/or transmit data to the peripheral device via the peripheral communication channel.

The software 142 further comprises an operating system 250 of the user device 140. The operating system comprises one or more software modules configured to manage the software and hardware of the user device 140. The operating system performs basic tasks such as file management, memory management and process management, and handling IO functionality.

The software 142 may further comprise a communication channel driver 230 configured to drive communication over each of the wireless peer-to-peer communication channels 141 and 175. In the embodiment illustrated in FIG. 2, each of the communication channels 141 and 175 comprise Bluetooth communication channels and the communication channel driver 230 comprises a Bluetooth channel driver.

In embodiments, the channel driver 230 is configured to establish each of the communication channels 141 and 175 via a channel establishment protocol in accordance with a communication protocol. For example, the channel driver 230 is configured to establish the Bluetooth channel 175 by wirelessly exchanging messages with the peripheral device 170 in accordance with a pairing process defined by the Bluetooth protocol standard. Similarly, the channel driver 230 is configured to establish the Bluetooth channel 141 by wirelessly exchanging messages with the DSD 100 in accordance with a pairing process defined by the Bluetooth protocol standard.

The channel driver may operate in conjunction with the operating system 250 of the user device 140, the DSD App 210 and/or applications 280 executing on the user device.

The authorized user device 140 may comprise a memory store 260 configured to store data for the DSD App 210 and the applications 280. Data may be arranged in one or more files.

States of the DSD

The DSD 100 may be in one of a plurality of operational states, wherein the operational states define how the DSD functions in response to various input stimuli.

The state of the DSD 100 is maintained by the storage controller 110. The storage controller may transition the DSD from one operational state to another operational state in response to commands received by the security controller 122. In embodiments, the security controller provides command messages to the storage controller, via the side channel 270. The command messages are referred to as side channel messages (e.g., SCMs). The SCMs may cause the storage controller 110 to transition the operational state of the DSD from one state to another state.

Figure 3:
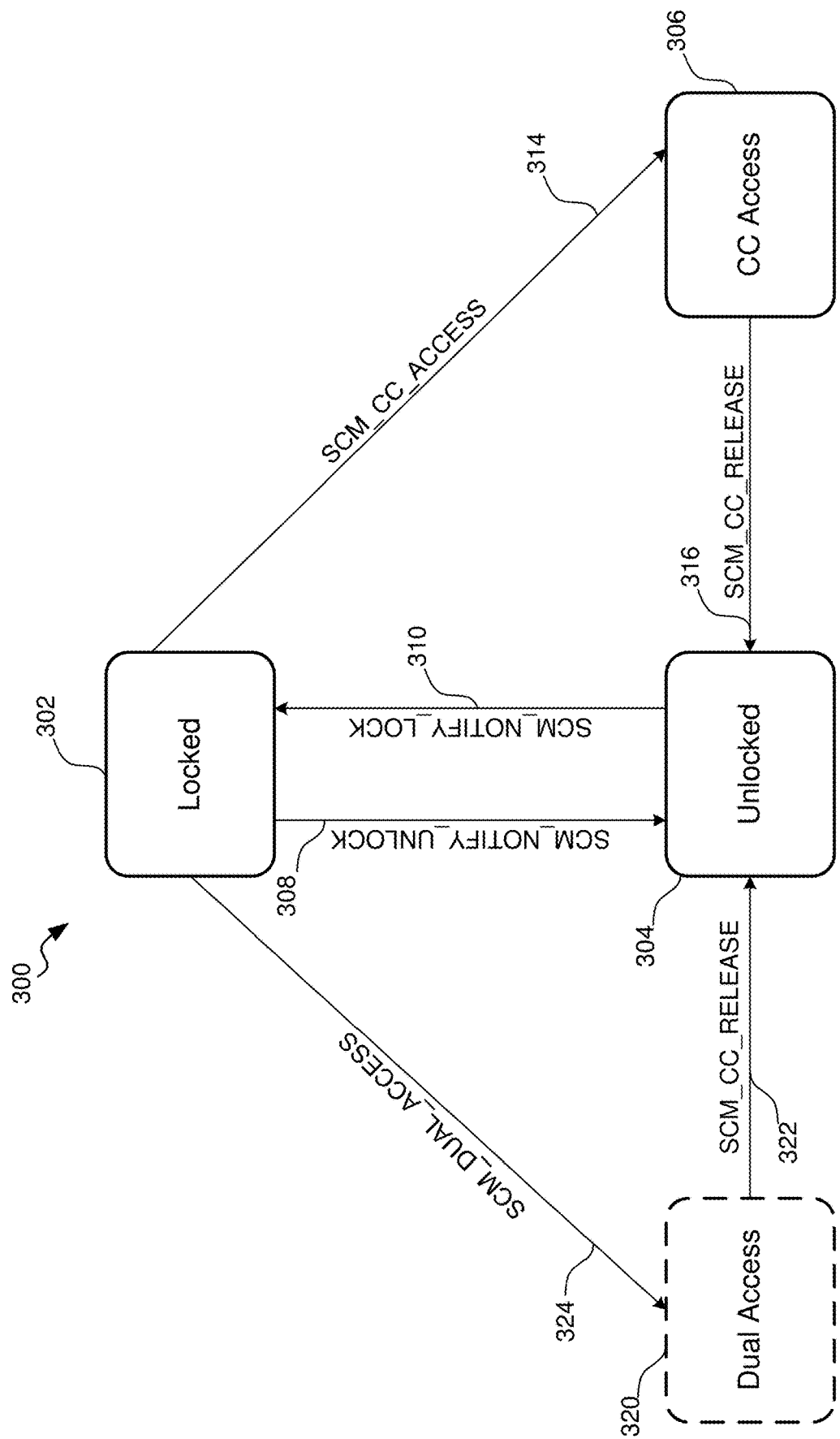
FIG. 3 is a state diagram illustrating some of the operational states of a data storage device, in accordance with an embodiment.

FIG. 3 is a state diagram 300 illustrating some of the operational states of the DSD 100, in accordance with an embodiment. In particular, the state diagram illustrates four of the operational states of the DSD, as well as the SCMs communicated from the security controller 122 to the storage controller 110 to trigger the transition of the DSD from one operational state to another operational state. In some embodiments, the DSD may be in an operational state not shown in FIG. 3.

The state diagram illustrates: the locked state 302, in which the DSD is configured to not provide access to the storage medium 108 via any communication channel; an unlocked state 304, in which the DSD is configured to provide access to the storage medium via the data channel 150; and a CC access state 306, in which the DSD is configured to provide access to the storage medium via the control channel 141. In some embodiment, the DSD may also transition to a Dual Access state 320, in which the DSD is configured to provide access to part of the storage medium via the control channel, and another part of the storage medium via the data channel.

It will be appreciated that the functionality of the DSD 100 may be further defined by configuration parameters, or operational sub-states that, together with the operational states of the DSD, define the functionality of the DSD. For example, in one or more of the unlocked state and CC access state, the DSD may be configured to provide limited, or modified access to the storage medium, such as read-only access, or access to a limited partition of the storage medium.

Locked State

By default, the DSD 100 is in the locked state 302. Furthermore, the storage controller 110 transitions the DSD to the locked state in response to receiving a SCM_NOTIFY_LOCK 310 message from the security controller 122.

In response to the DSD 100 being in the locked state 302, the storage controller 110 locks the data path 104, such that the DSD does not action any read or write commands received from the host computer 130 via the data channel 150.

In embodiments, when the DSD is in the locked state, in response to receiving a media access command, such as a read command or a write command, from the host computer, via data channel 150, the DSD transmits a locked state indication to the host computer 130. In embodiments, the locked state indication may indicate, to the host computer, that the DSD is not ready to action any media access commands. In embodiments, the locked state indication may indicate, to the host computer, that there is not storage medium present in the DSD (e.g. MEDIUM NOT PRESENT, MEDIUM NOT FOUND).

In response to the DSD 100 being in the locked state 302, the DSD may receive power via the power interface 105. In response to the power port 106 being connected to the host computer 130, the DSD may receive power from the host computer via the power interface.

In response to the DSD 100 being in the locked state 302, the security controller 122 does not action any read or write commands received from the user device via the control channel 141.

CC Access State

The DSD 100 can transition from the locked state 302 to the CC access state 304 in response to receiving a SCM_CC_ACCESS 314 message from the security controller 122. The security controller 122 provides such a message in response to successfully performing a secure unlocking process in response to receiving a request from the DSD App 210 to provide storage medium access to application(s) running on the authorized user device 140.

In response to the DSD 100 being in the CC access state 306, the storage controller 110 unlocks the DSD only for media access commands received via the control channel 141. Furthermore, in response to the DSD 100 being in the CC access state, the storage controller 110 maintains the data path 104 in a locked state, such that the DSD does not action any read or write commands received from the host computer 130 via the data channel 150. In embodiments, when the DSD is in the CC access state, in response to receiving a media access command, such as a read command or a write command, from the host computer, via data channel 150, the DSD transmits an error message to the host computer 130. In embodiments, the error message may indicate, to the host computer, that the DSD is not ready to action any media access commands. In embodiments, the error message may indicate, to the host computer, that there is not storage medium present in the DSD (e.g., MEDIUM NOT PRESENT, MEDIUM NOT FOUND).

In response to entering the CC access state 306, the DSD 100 registers, with the authorized user device 140, as a block data storage device. In embodiments, the DSD provides information, to the user device, via the control channel 141 in the form of a device descriptor. The device descriptor contains relevant information about the DSD and the storage medium 108.

The device descriptor may provide structured information regarding the DSD such as the class of device, protocols supported, type of device, manufacturer and other configuration parameters. The operating system 250 of the user device 140 can obtain the device descriptor of the data storage device by sending various standard control requests (e.g., GET_DESCRIPTOR requests) to the DSD via the control channel 141. In response to receiving these requests, the DSD provides the device descriptor information to the user device, thus registering the DSD with the user device as a block data storage device. The user interprets device descriptor information to determine the configuration and capabilities of the DSD. The operating system 250 of the user device may then store information regarding the DSD in the registers of the operating system.

Once the DSD is registered as a block storage device with the operating system of the authorized user device 140, the DSD App 210 functions as a virtual device driver, facilitating the transmission of data between the applications 280 and the DSD via the control channel 141. Accordingly, the DSD App 210 provides an interface via which other applications 280, such as the peripheral device application 220, may read and/or write from the storage medium 108 of the DSD 100 via the control channel 141.

In response to the DSD being in the CC access state, the DSD is configured to automatically receive files transmitted from the user device to the DSD, via the control channel 141. Advantageously, there is no need for the user to provide any input into the DSD to enable (e.g., trigger, cause) the DSD to receive the file transmitted from the user device.

Unlocked State

The DSD 100 can transition from the locked state 302 to the unlocked state 304 in response to receiving a SCM_NOTIFY_UNLOCK 308 message from the security controller 122. The security controller 122 provides such a message in response to successfully performing a secure unlocking process in response to receiving an unlock request from the DSD App 210 on the authorized user device 140.

Additionally, the DSD 100 can transition from the CC Access state 302 to the unlocked state 304 in response to receiving a SCM_CC_RELEASE 316 message from the security controller 122. The security controller 122 provides such a message in response to receiving an indication that the DSD App 210 on the authorized user device 140 has ceased exposing the DSD for storage medium access for application(s) running on the authorized user device.

In response to the DSD 100 being in the unlocked state 304, the storage controller actions media access commands received from the host computer 130, via the data channel 150. In particular, when the DSD is in the unlocked state 304, in response to receiving a read command from the host computer 130 via the data channel, the storage controller obtains the read data from the storage medium 108, and provides the read data to the host computer via the data channel 150. Similarly, when the DSD is in the unlocked state, in response to receiving a write command from the host computer via the data channel 150, the DSD receives the write data via the data channel and writes the write data to the storage medium.

In response to entering the unlocked state, the DSD 100 registers, with the host computer system 130, as a block data storage device. For example, the DSD provides information, to the host computer, via the data port 180 in the form of a USB device descriptor. The USB device descriptor contains relevant information about the DSD. Accordingly, in embodiments in which the data storage device is connected to a host computer system via a USB connection, the data storage device registers with the host computer system as a block data storage device by configuring its USB device descriptor to indicate that the data storage device is a block data storage device.

The USB device descriptor provides structured information regarding the USB device such as the class of device, protocols supported, type of device, manufacturer and other configuration parameters. An operating system of a host computer can obtain the USB device descriptor of the data storage device by sending various standard control requests (e.g., GET_DESCRIPTOR requests) to the data storage device. In response to receiving these requests, the data storage device provides the USB_DEVICE_DESCRIPTOR to the host computer system, thus registering the data storage device with the host computer system as a block data storage device. The host computer interprets the USB_DEVICE_DESCRIPTOR to determine the configuration and capabilities of the data storage device. The host computer system may then store information regarding the data storage device in the registers of the operating system of the host computer system.

Secure Unlocking Process

Unless securely unlocked by an authorized user device, the DSD 100 remains in the locked state 302. To transition the DSD out of the locked state, into either the unlocked state 304 or the CC access state 306, the DSD App 210 is configured to perform, in conjunction with the security controller 122 of the DSD 100, a secure unlocking process.

The security controller 122 is configured to perform the secure unlocking process in response to receiving, from the authorized user device 140, over the control channel 141, an unlock request. The unlock request may comprise one or more transmissions over the control channel.

The unlock request comprises a command from the DSD App for the security controller to enable CC access. The command to enable CC access may comprise a flag in a message header.

As described in further detail herein, when performed in conjunction with a command to enable CC access, the secure unlocking process can provide the user device with data transfer access to the storage medium of the DSD 100 via the control channel 141. In contrast, when performed without a command to enable CC access, the secure unlocking process can provide the host computer 130 with data transfer access to the storage medium of the DSD 100 via the data channel 150.

The secure unlocking process may comprise verifying the user's authorization to access the storage medium of the DSD. An example secure unlocking process is described in U.S. patent application Ser. No. 16/706,780 which is incorporated herein by reference. Additionally, an example secure unlocking process is described below, in relation to FIG. 14.

In embodiments, the secure unlocking process comprises: the DSD App receiving, from the security controller 122, a cryptographic challenge; the DSD App determining a response to the cryptographic challenge and transmitting the response to the security controller over the control channel; and the security controller verifying the validity of the response.

Notably, the security controller 122 sends the challenge to the authorized user device 140 over a communication channel that is different from the data channel to the host computer system. For example, the data channel may include a wire-based USB connection while the communication channel between the security controller 122 and the authorized user device 140 is a wireless (e.g., Bluetooth) connection.

In response to the security controller 122 being able to verify the authorization of the user device, the secure unlocking process completes successfully. Through the secure unlocking process, the security controller can determine the cryptographic key by which the cryptographic engine can decrypt the encrypted data stored in the storage medium.

User Device GUI

Figure 4:
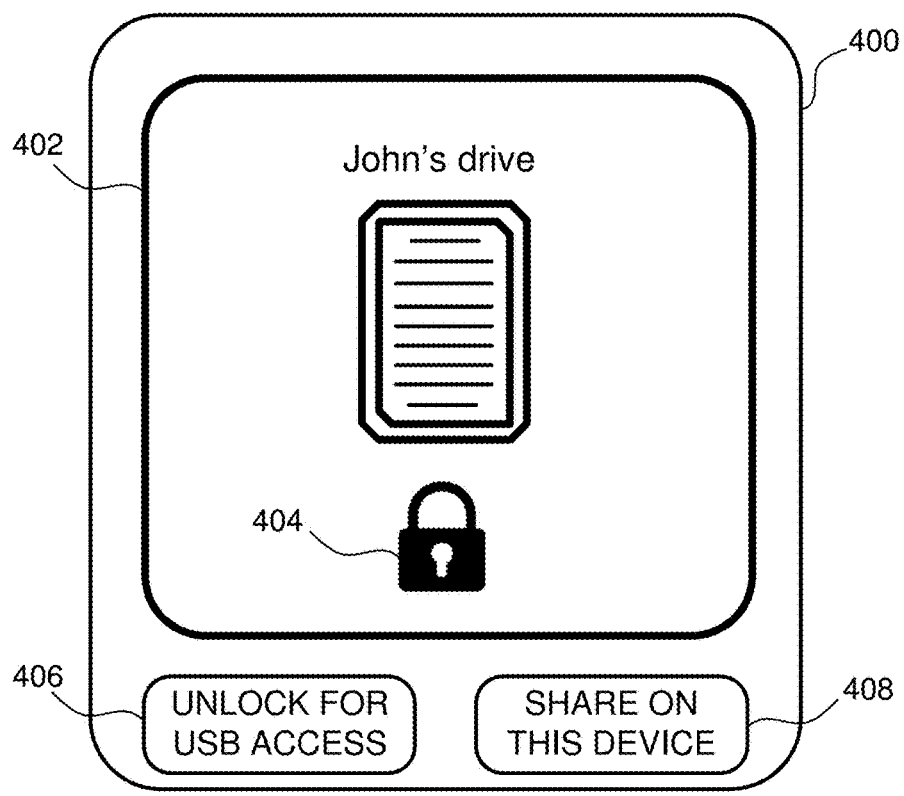
FIG. 4 illustrates a graphical user interface for a data storage device application, as displayed on a user device, in accordance with an embodiment.

FIG. 4 illustrates a graphical user interface (GUI) 400 for the DSD App 210, as displayed on the user device 140, in accordance with an embodiment. The graphical user interface 400 will be referred to as the DSD App GUI 400, herein. The DSD App GUI provides a user 101 with information regarding the identification of the DSD 100. In particular, the DSD App GUI indicates, via name 402, that the DSD 100 is referred to as 'John's drive'. Furthermore, the DSD App GUI provides the user with information regarding the operational state of the DSD 100. In particular, the DSD App GUI indicates, via icon 404 that 'John's drive' is currently in the LOCKED operational state.

The DSD App GUI also provides the user with the means in which to control the operational state of the DSD 100. Via the graphical user interface of the DSD App, the user can select to expose the DSD as a mass storage device to one or more of the applications 280, executing on the user device 140. In particular, the user has the option of activating button 406 (e.g., UNLOCK FOR USB ACCESS) to cause the DSD App 210 to perform an unlock process, without a command to enable CC access. In the unlocked state, the DSD (e.g., John's drive) is enabled for data transfers between the host computer 130 and the DSD via the data channel 150.

Furthermore, the user has the option of activating button 408 (e.g., SHARE ON THIS DEVICE) to cause the DSD App 210 to perform an unlock process with a command to enable CC access state. In the CC access state, the DSD (e.g., John's drive) is enabled for data transfers between the user device 140 and the DSD via the control channel 141.

Registering the DSD

In accordance with an embodiment, the write process via the control channel 141 will be described in relation to FIGS. 6 and 7.

Figure 6:
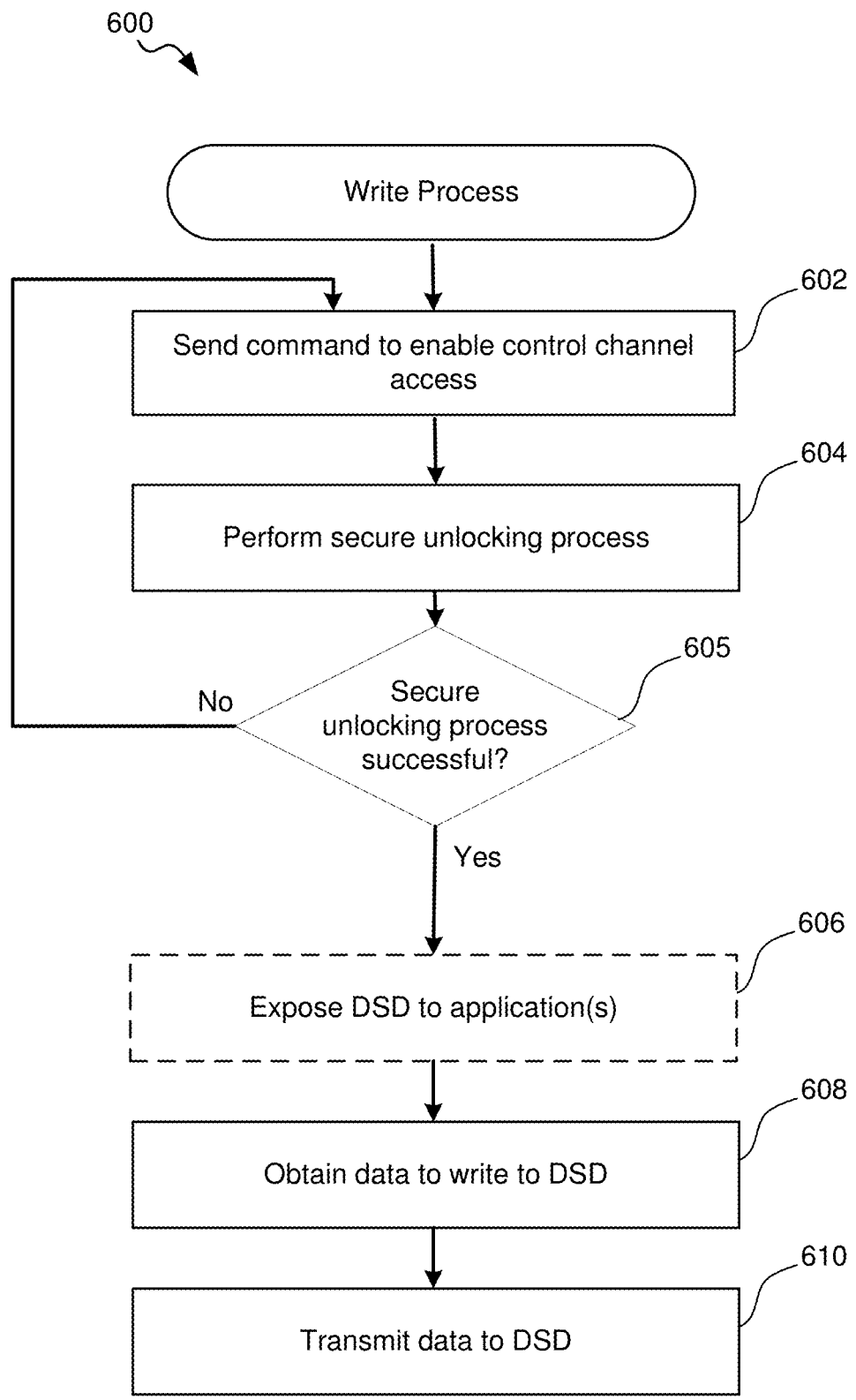
FIG. 6 is a flowchart illustrating a process for transmitting data from an authorized user device to a data storage device, in accordance with an embodiment.

FIG. 6 is a flowchart illustrating a process 600 for transmitting data from the authorized user device 140 to the DSD 100, to be stored in the storage medium 108, in accordance with an embodiment. Process 600 may be performed by the user device software 142, including the DSD App 210, the operating system 250 and the peripheral device application 220.

Figure 7:
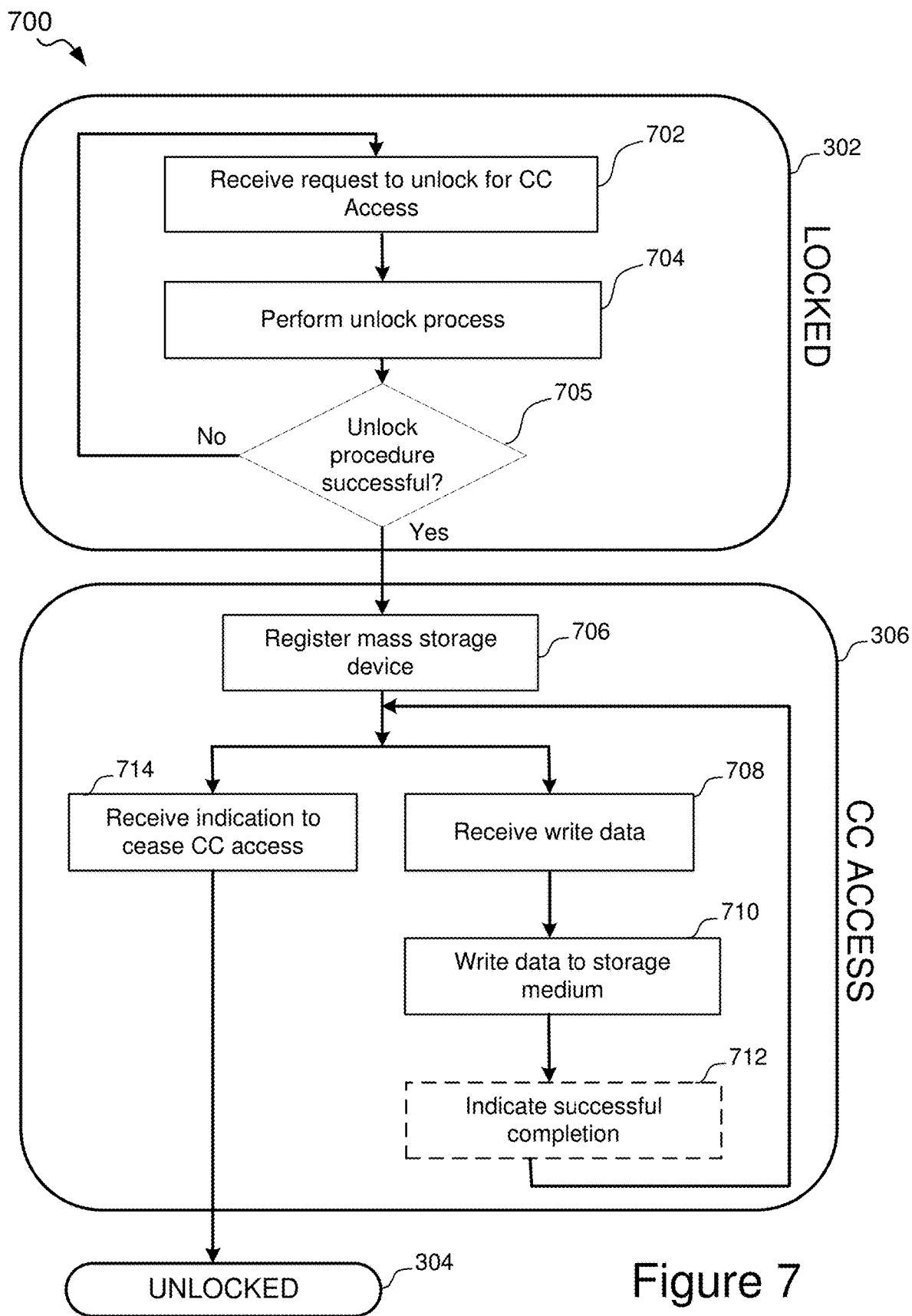
FIG. 7 is a flowchart illustrating a process, as performed by a security controller, to perform a write operation of write data, received from a user device via the control channel, in accordance with an embodiment.

FIG. 7 is a flowchart illustrating a process 700, as performed by the security controller 122 of the DSD 100, to perform a write operation of write data, received from the user device via the control channel, in accordance with an embodiment.

The write process 600 may be proceeded by user device 140 establishing a peer-to-peer wireless communication channel between the user device and the DSD 100. For example, in embodiments in which the control channel 141 comprises a Bluetooth communication channel, the user device may pair with the DSD to establish the peer-to-peer wireless communication channel 141.

The write process 600 may also be proceeded by steps taken by the user device 140, the DSD 100 and the manager device 160 to authorize the user device 140 as an authorized user device with regard to the DSD 100.

Upon establishment of the control channel 141, the DSD will be in the locked state 302. Accordingly, when processes 600 and 700 start, the DSD 100 is in the locked state 302.

In operation 602, the DSD App 210 transmits, to the DSD a command to enable control channel access, to unlock the DSD 100 for data transfer over the control channel. In other words, the user device transmits to the DSD a command for the DSD to transition from the locked state 302 to the CC access state 306.

In operation 702, the security controller 122 receives, from the DSD App 210, via the control channel 141, the command to enable control channel access. In operation 704, in response to receiving the command to enable control channel access, the security controller 122, in conjunction with the DSD App 210 (in operation 604), performs the secure unlocking process to transition the DSD from the locked state to the CC access state. In operation 605, the DSD App 210 evaluates whether the secure unlocking process was successful. In operation 705, the security controller 122 evaluates whether the secure unlocking process was successful.

In operation 706, in response to the successful completion of the secure unlocking process, the DSD transitions to the CC access state 306, and the DSD 100 registers, with the authorized user device 140, as a block data storage device.

To provide the storage medium 108 for use by one or more application 280 of the user device, in operation 606, the DSD 210 may optionally register the storage medium of the DSD with the operating system 250 as an external mass storage device (e.g., a block storage device). In other words, the DSD App exposes the storage medium 108 (or part thereof) as external storage space for one or more of the applications 280. The operating system may provide a representation 290 of the external storage space within the memory store of the user device. The DSD App may then act as a virtual device driver, facilitating the transmission of data from the one or more applications 280 to the storage medium 108 of the DSD, via the control communication channel 141. The DSD App 210 provides device driver functionality to liaise with the security controller 122 to provide data transfers between the user device and the storage medium 108.

The DSD App 210 may specify limitations associated with access to the storage medium 108 of the DSD by the applications 280. These limitations may be policed by the operating system 250 of the user device. These limitations may be configured, or configurable by a user of the user device.

In some embodiments, the DSD App may specify that the DSD is: a read only storage space; a write only storage space; may be accessed by a specified set of application 280; may be accessed for a specified period; may only be accessed for data transfers below a maximum size; or other limitations.

Obtaining Write Data

In operation 608, the DSD App obtains, or determines, write data to be written to the storage medium 108 of the DSD. The user device 140 may obtain the write data from a number of sources. In one embodiment, the write data is generated by the peripheral device 170, and sent to the user device via peripheral communication channel 175. In one embodiment, the user device is configured to establish a wireless peer-to-peer control channel with a second data storage device and receive write data from the second data storage device by sending read commands to the second data storage device. In one embodiment, the user device is configured to obtain the write data from one or more application 280 executing on the user device. The write data may be stored in memory store 260.

Data from Peripheral Device

Figure 9:
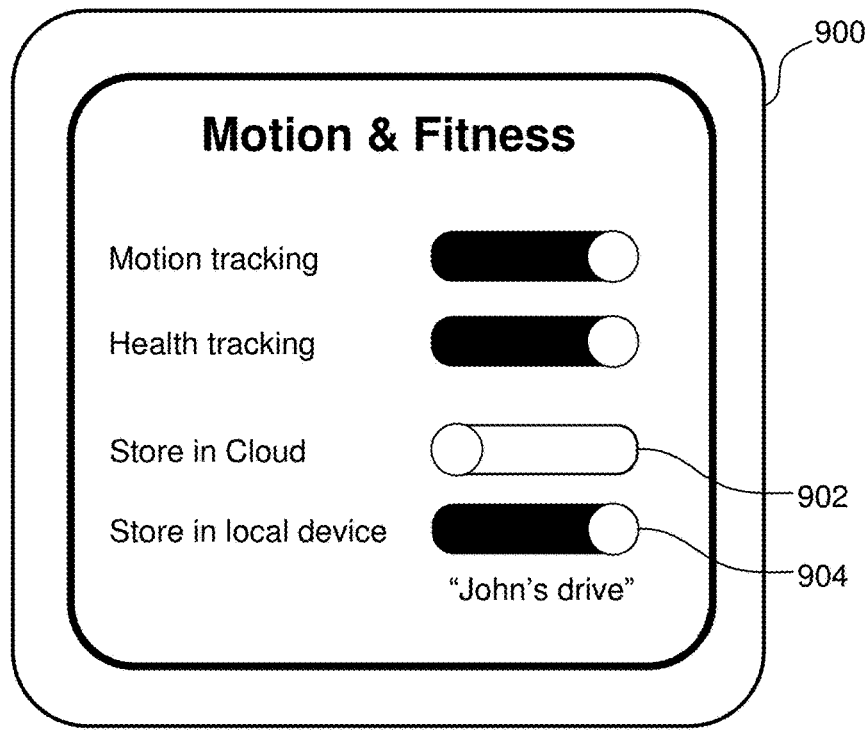
FIG. 9 illustrates part of a graphical user interface for the peripheral device application, as displayed on a user device, in accordance with an embodiment.

FIG. 9 illustrates part of a graphical user interface (GUI) 900 for the peripheral device application 220, as displayed on the user device 140, in accordance with an embodiment. In this embodiment, the peripheral device 170 comprises a wearable fitness tracking device, which generates fitness data based on parameters sensed by the peripheral device. The peripheral device transmits the generated peripheral data 205 to the peripheral device application via the peripheral communication channel 175. The peripheral device application may process the peripheral data. The peripheral device application may store the fitness data in a storage location, as chosen by the user. In response to the user selecting a remote storage location, such as a Cloud server or the storage medium 108 of the DSD, the peripheral device application may buffer the fitness data locally before periodically transmitting it to the storage location.

The graphical user interface 900 provides a user 101 with configuration operations regarding what peripheral data is to be determined by the peripheral device 170 and where the peripheral data is to be stored. In particular, GUI object 902 provides the user with the option of choosing to store the peripheral data on a remote server (e.g., on the Cloud) accessible by user device 140 via communication channel 195. GUI object 902 is deactivated in the example shown in FIG. 9.

GUI object 904 provides the user with the option of choosing to store the peripheral data in a local DSD. The activation of GUI object 904 may comprise a request, from the user, to transfer data from the peripheral device, via the user device, to the storage medium of the data storage device.

In response to a user activating GUI object 904, the peripheral device application determines, based on information provided by the operating system 250, a list of local devices (if any) that have been registered with the operating system, for use by the peripheral device application.

As the DSD 100 ("John's drive") has been registered by the DSD App 210 as a local storage device in operation 606, the peripheral device application provides the user with the option of selecting "John's drive" as a storage location for the peripheral data 205. GUI object 904 indicates that the user has selected "John's drive" as the storage location for the peripheral data.

The peripheral device transmits peripheral data 205 to the peripheral device application 220, via the Bluetooth communication channel 175, and the Bluetooth driver 230. In some embodiments, in operation 610, the peripheral device application 220 stores a copy of the peripheral data in memory store 260.

In operation 610, the DSD App 210, acting as a device driver for the DSD 100, receives the peripheral data 205 from the peripheral device application 220, via the memory store 260. The DSD App transmits the peripheral data to the DSD, via the control channel 141, as one or more write commands.

DSD to DSD Data Transfer

Figure 10:
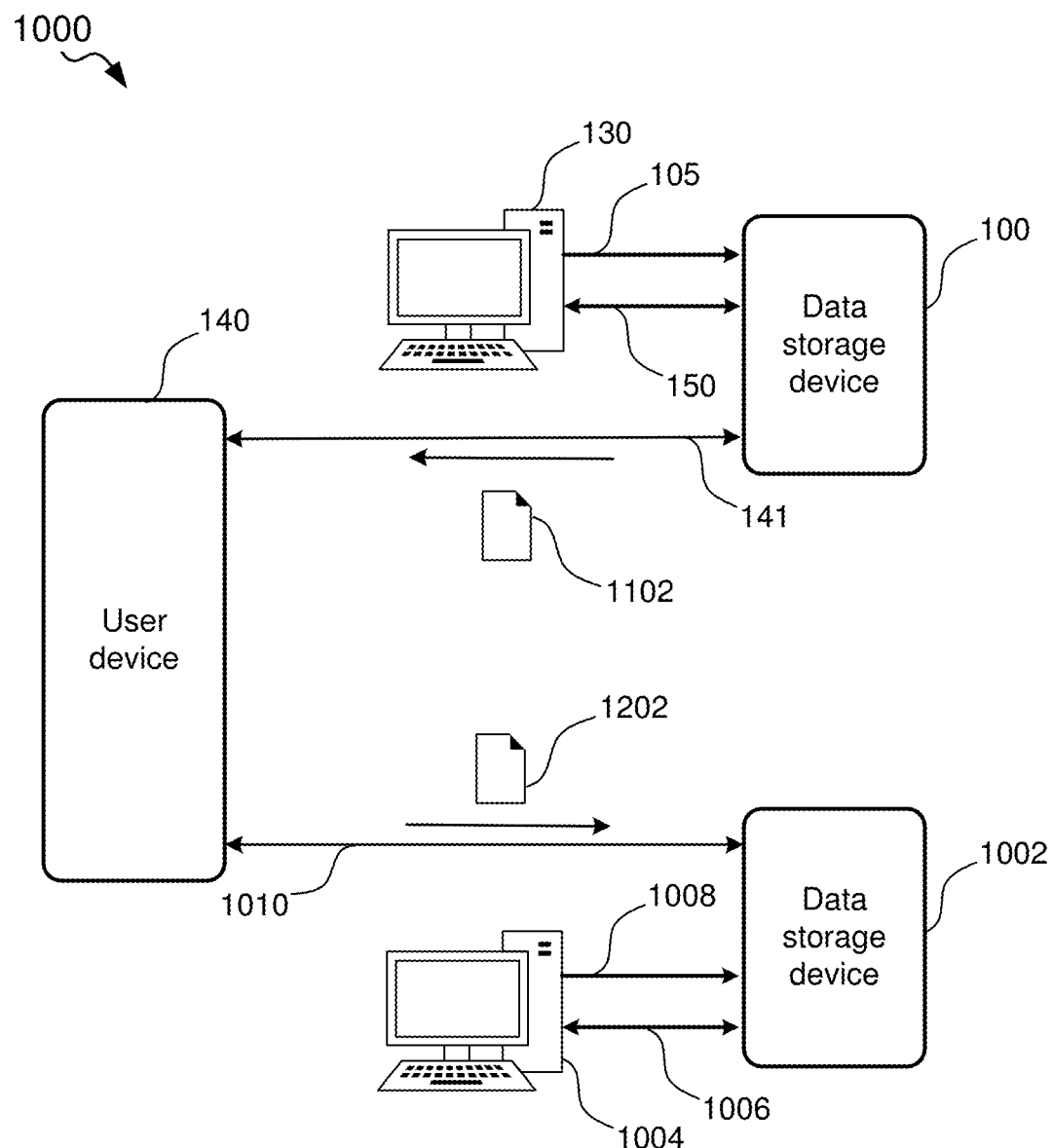
FIG. 10 is a block diagram illustrating the system architecture comprising a first data storage device, a second data storage device and an authorized user device, in accordance with an embodiment.

FIG. 10 is a block diagram illustrating the system architecture comprising the DSD 100 (referred to as the first DSD 100 in relation to this figure), a second DSD 1002 and the authorized user device 140, in accordance with an embodiment. In embodiments, both the first DSD 100 and the second DSD 1002 may be communicatively coupled to a DSD App 210 executing on the user device 140. The DSD App has successfully completed unlocking processes for both the first DSD 100, and the second DSD 1002.

In accordance with the architectures of FIGS. 1 and 2, the user device 140 is in communication with the first DSD 100 via control channel 141. Via control channel 141, the user device can write files from the user device to the storage medium 108 of the first DSD 100.

The user device 140 has also established a wireless peer-to-peer control communication channel 1010 between the user device and a second DSD 1002. Via control channel 1010, the user device can read files from a storage medium of the second DSD 1002 to the user device. Depending upon the configuration of the second DSD 1002 and the DSD App 210, the user device may also be configured to write files from the user device to the storage medium of the second DSD 1002.

Accordingly, the DSD App may be used to transfer data (e.g. files) from one DSD to another DSD, via their respective control channels. The DSD App may provide a graphical user interface to enable the user to easily transfer files from one DSD to another DSD. The graphical user interface may comprise file structure information. In embodiments, following the successful completion of the secure unlocking process, the DSD App may obtain information regarding the structure of files stored in a storage medium of the DSD.

Figure 11:
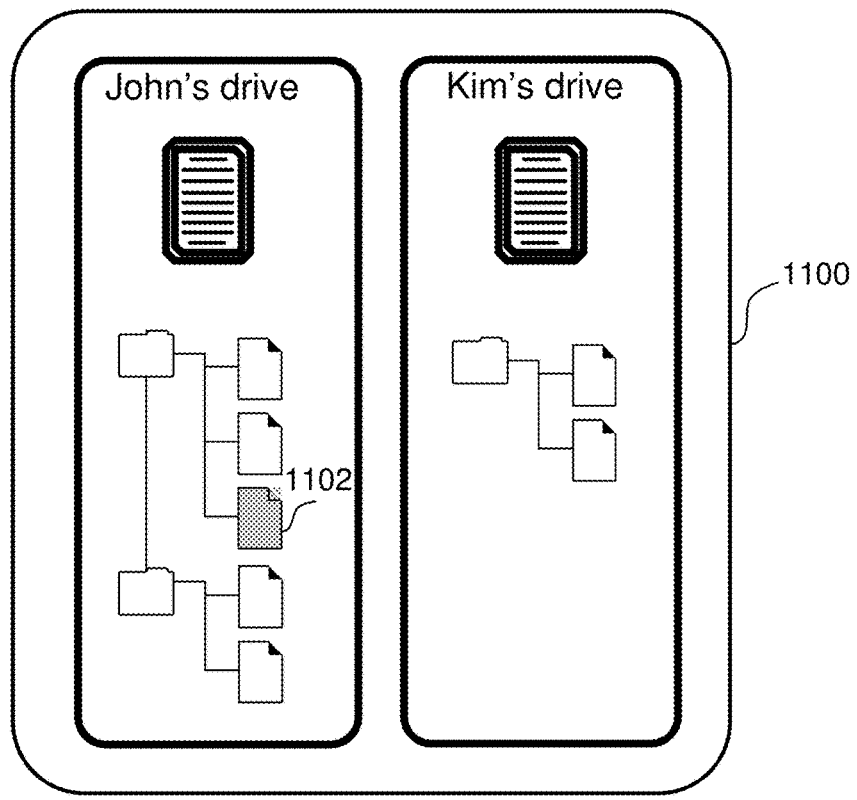
FIG. 11 illustrates a graphical user interface of a data storage device application illustrating the file structures of a first data storage device and a second data storage device, in accordance with an embodiment.

FIG. 11 illustrates a graphical user interface 1100 of the DSD App illustrating the file structures of a first DSD and a second DSD, in accordance with an embodiment. The graphical user interface 1100 comprises a graphical representation of the files stored in the storage medium 108 of the first DSD 100, and a graphical representation of the files stored in the storage medium of the first DSD 1002.

Figure 12:
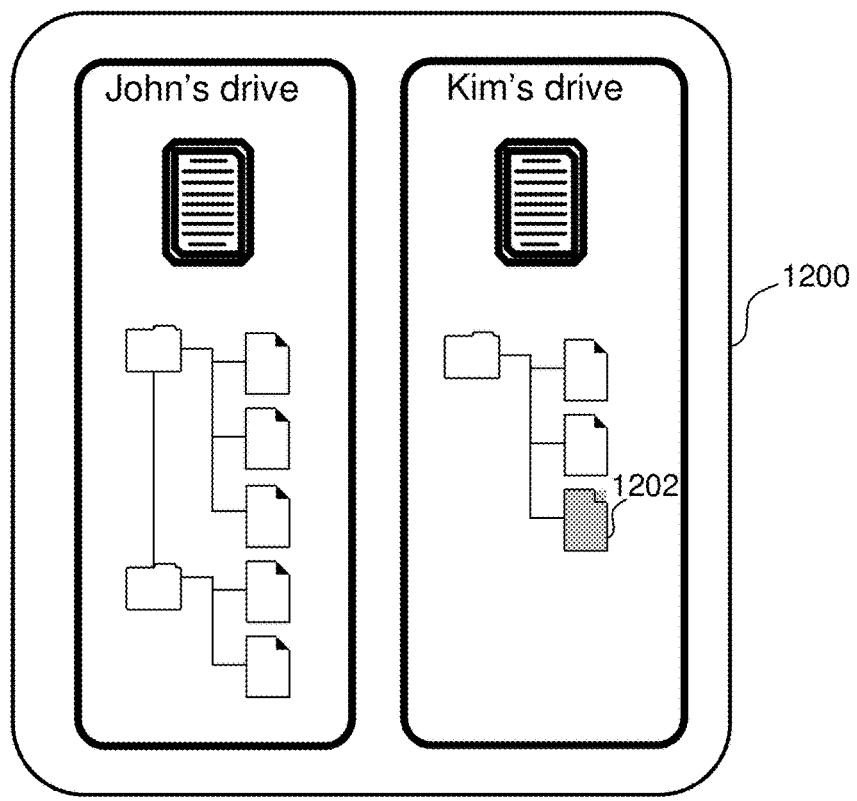
FIG. 12 illustrates a graphical user interface, comprising the graphical user interface of FIG. 11, as modified by a data storage device application in response to the user dragging and dropping a file representation, in accordance with an embodiment.

FIG. 12 illustrates a graphical user interface 1200, comprising the graphical user interface 1100 of FIG. 11, as modified by the DSD App in response to the user dragging and dropping file representation 1102 from a first DSD to a second DSD, in accordance with an embodiment. The dragging and dropping of file representation 1102 may comprise a request, from the user, to transfer data from the second data storage device, via the user device, to the storage medium of the first data storage device. Graphical user interface 1200 indicates that file 1102 has been copied to the second DSD 1002, a file 1202.

Figure 13:
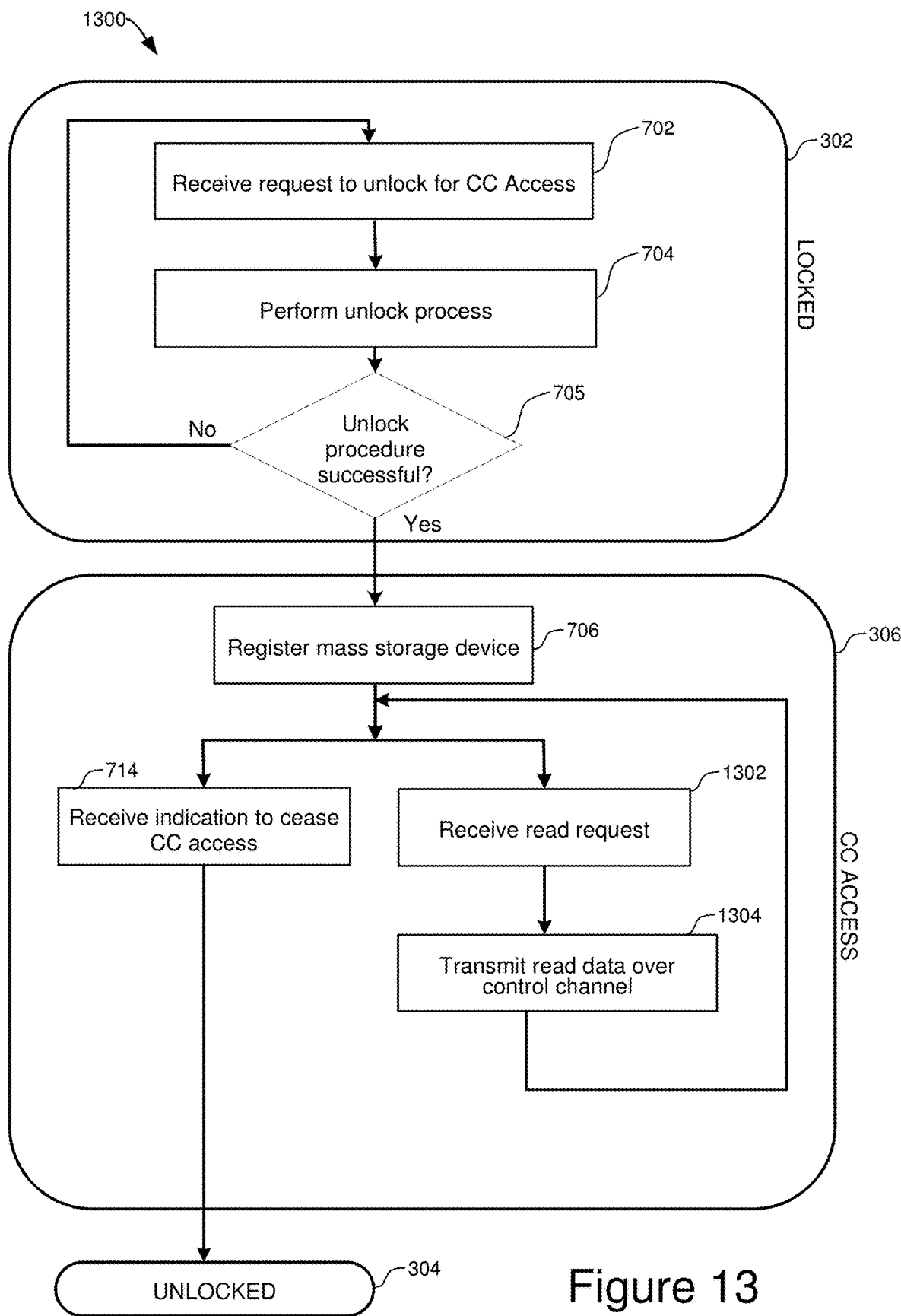
FIG. 13 is a flowchart illustrating a process, as performed by a security controller of the data storage device, to perform a read operation, and transmit the read data to a user device via the control channel, in accordance with an embodiment.

FIG. 13 is a flowchart illustrating a process 1300, as performed by the security controller 122 of the DSD 100, to perform a read operation, and transmit the read data to the user device via the control channel, in accordance with an embodiment. Process 1300 largely comprises process steps as described in relation to FIG. 7, with the inclusion of read steps 1302 and 1304.

In response to a user selecting the transfer of a file 1102 from the first DSD to the second DSD, the DSD App issues a read command to the first DSD 100, wherein the read command includes a reference to file 1102. In operation 1302, the DSD 100 receives the read command. In operation 1304, the DSD reads the read data (e.g., file 1102) from the storage medium 108 and transmits the read data to the user device via control channel 141.

The DSD App receives the read data (e.g., file 1102) and transmits a write command to the second DSD 1002, via control channel 1010, wherein the write command comprises file 1102 (now referenced as 1202). The second DSD writes the file 1202 to its storage medium. Writing to the DSD Referring again to FIG. 6, which illustrates a process performed by the DSD App 210 of the user device 140. In operation 610, the DSD App, acting as a device driver for the DSD 100, transmits a write command to the DSD, via the control channel 141. In embodiments, the write command comprises write data and an indication of a write address within the storage medium.

In operation 708, the security controller 122 receives a write command, comprising write data and an indication of a write address, from the user device 140, via the control channel. In operation 710, the security controller 122 instructs the storage controller 110 to write the write data to the storage medium 108. Optionally, the security controller may transmit an indication of the successful completion of the write operation to the user device, in operation 712.

The security controller may receive a plurality of write commands from the user device while the DSD is in the CC access state 306.

Reading from the DSD

In some embodiments, while in the CC access state 306, the security controller may receive a read command from the user device, via the control channel 141. In response to receiving the read command, the security controller instructs the storage controller to obtain read data from the storage medium, and the security controller transmits the read data to the user device via the control channel.

CC Access Enabled

Figure 5:
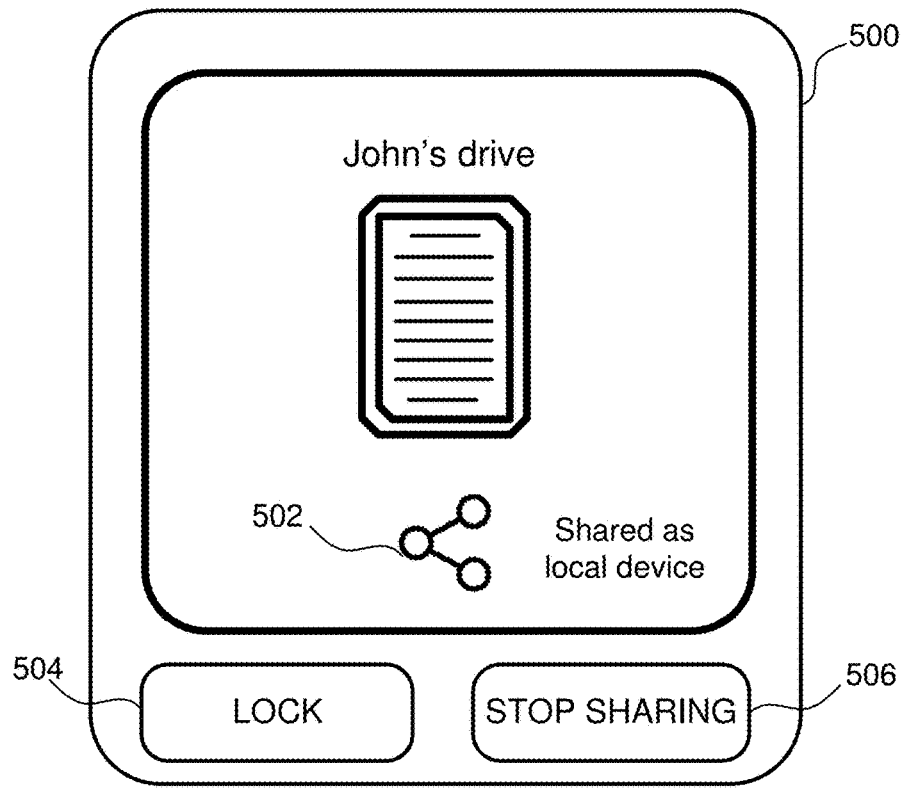
FIG. 5 illustrates a graphical user interface, comprising the graphical user interface of FIG. 4, as modified by the data storage device application in response to a user activating a button, in accordance with an embodiment.

FIG. 5 illustrates a graphical user interface 500, comprising the graphical user interface 400 of FIG. 4, as modified by the DSD App in response to the user activating the button 408, in accordance with an embodiment.

GUI 500 provides an indication, to the user, of the operational state of the DSD 100. In particular, the GUI indicates, via icon 502, that the DSD 100 has been made accessible to one or more applications 280 for data transfers via the control channel 141.

GUI 500 also provides the user with the means in which to control the operational state of the DSD 100. In particular, the user has the option of activating button 504 (e.g., LOCK) to cause the DSD App 210 to perform a lock process to disable data transfers to/from the DSD over both the data channel 150 and the control channel 141. Furthermore, the user has the option of activating button 506 (e.g., STOP SHARING) to cause the DSD App 210 to disable the DSD for data transfers over the control channel 141, and to transition the DSD into the UNLOCK state 304 for data transfers between the host computer 130 and the DSD via the data channel 150.

Ceasing CC Access

Referring again to FIG. 5, in response to the user activating button 506 (e.g., STOP SHARING), the DSD App 210 instructs the operation system 250 to deregister the DSD 100 as an external mass storage device.

Furthermore, in response to the user activating button 506 (e.g., STOP SHARING), the DSD App 210 transmits, to the security controller 122, via the control channel 141, an indication to cease control channel access.

In operation 714, in response to receiving the indication to cease control channel access, the security controller 122 transitions the DSD from the CC access state 306 to the unlocked state 304.

Locking the DSD

Figure 8:
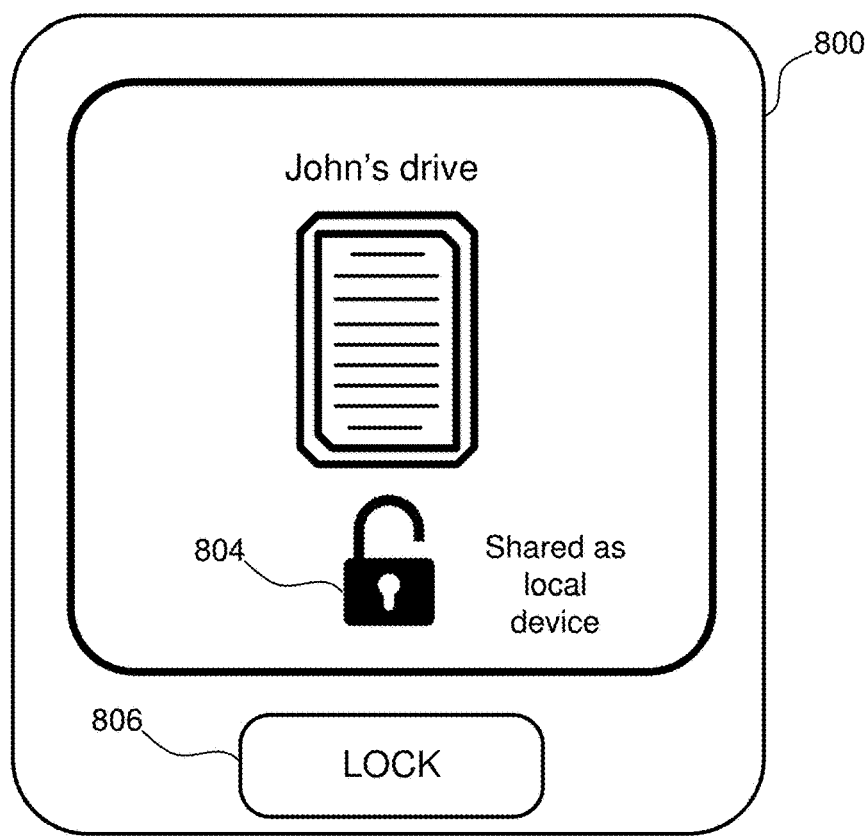
FIG. 8 illustrates a graphical user interface, comprising the graphical user interface of FIG. 4, as modified by the data storage device application in response to the user activating a button, in accordance with an embodiment.

FIG. 8 illustrates a graphical user interface 800, comprising the graphical user interface 400 of FIG. 4, as modified by the DSD App in response to the user activating the button 406, in accordance with an embodiment.

GUI 800 provides an indication, to the user, of the operational state of the DSD 100. In particular, the GUI indicates, via icon 804, that the DSD 100 has been made accessible to the host computer system 130 for data transfers via the data channel 150.

GUI 800 also provides the user with the means in which to control the operational state of the DSD 100. In particular, the user has the option of activating button 806 (e.g., LOCK) to cause the DSD App 210 to perform a lock process to disable data transfers to/from the DSD over both the data channel 150 and the control channel 141.

Dual Access

In some embodiments, the DSD 100 is configured to provide data transfer access on both the control channel 141 and the data channel 150 at the same time. Accordingly, in such embodiments, the host computer 130 and the authorized user device 140 can both perform data transfer operations on the storage medium 108 of the DSD. In some embodiments, to maintain data integrity, and to avoid data access clashes, the storage controller 110 allocates a portion (or set of portions) of the storage medium 108 to be used by the host computer and a different portion (or set of portions) of the storage medium to be used by the authorized user device.

In embodiments in which the DSD is configured to provide dual data access, the operational states of the DSD, as illustrated in FIG. 3, comprise a Dual Access state 320.

Example Securely Unlocking the DSD

Figure 14:
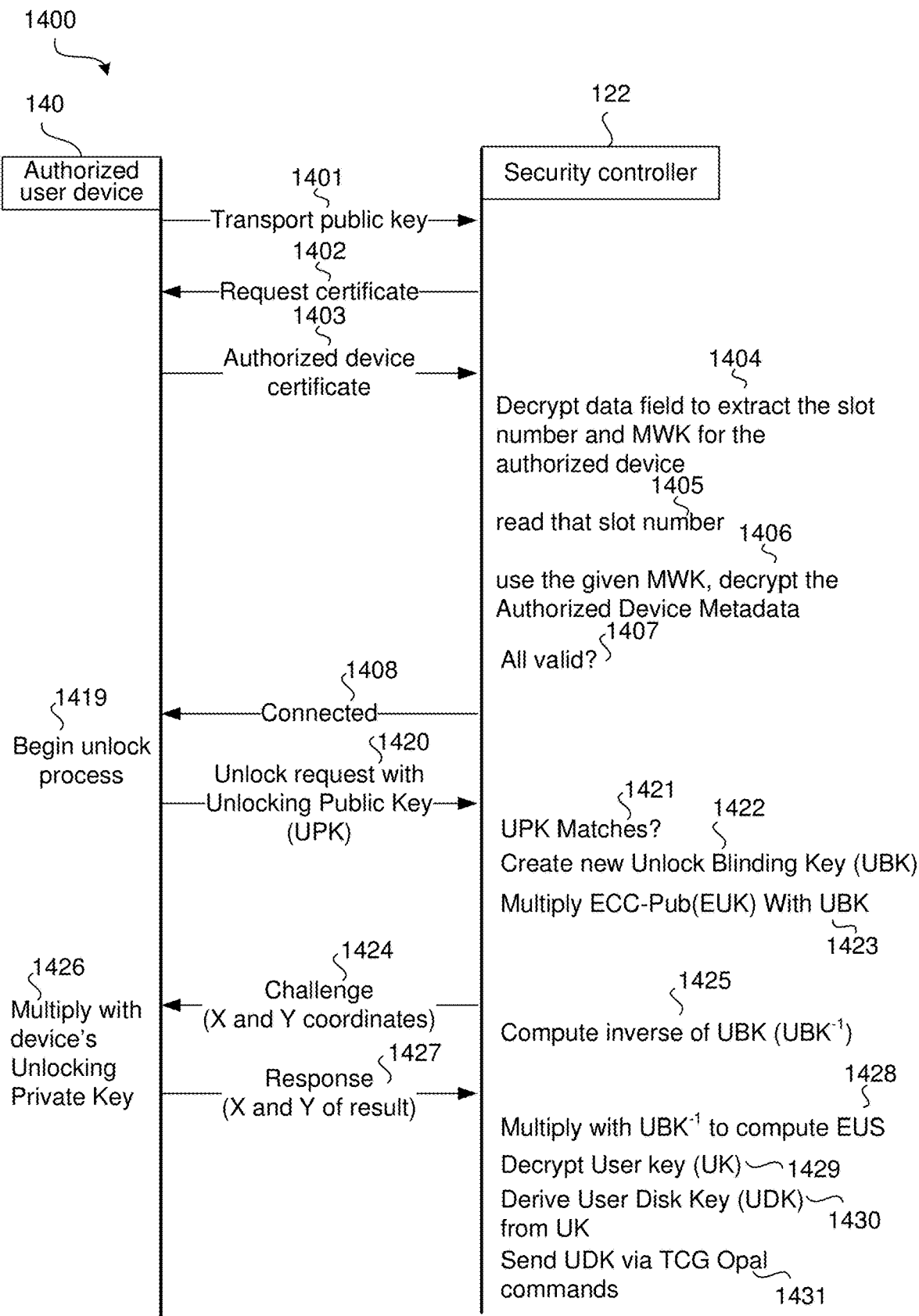
FIG. 14 illustrates a control flow between an authorized user device and a security controller to perform a connection process and an unlocking process, in accordance with an embodiment.

FIG. 14 illustrates the control flow 1400 between an authorized user device 140 and a security controller 122 to perform a connection process and an unlocking process, in accordance with an embodiment.

The authorized user device 140 initiates the connection process by sending a message 1401 comprising the user device's transport public key. This step can be easily re-played by an attacker. Security controller 122 then replies 1402 with a request for a certificate. In response to this request, user device 140 sends 1403 a certificate previously obtained from the security controller 122 through a re-enrolment process.

The certificate includes an encrypted metadata wrapping key (MWK) to security controller 122. The certificate also includes a slot number, which is an index of a record stored in configuration memory 115.

Security controller 122 uses the authorized user device slot key stored in configuration memory 115 to decrypt 1404 data field, and extract the slot number and metadata wrapping key. Security controller 122 then queries configuration memory 115 to read 1405 the appropriate record from configuration memory 115 and decrypts 1406 the authorized user device metadata using the metadata wrapping key. This yields an ephemeral public key, which may also be referred to as an identifier of the authorized user device because it uniquely identifies the authorized user device since the ephemeral public key is cryptographically associated with an unlocking private key stored only on authorized user device 140. Security controller 122 may perform additional checks 1407, such as validate that the transport public key included in the authorized user device metadata matches the transport public key presented in the certificate. Further, security controller 122 validates the role against the valid set of values, and associates the role with the connection. This means that security controller 122 is aware of the current role (authorized user device or manager device) during the duration of connection. For example, security controller 122 stores a parameter value on volatile memory that indicates the role provided in the certificate. In response to any of the preceding checks failing, the authorized user device is deemed to be revoked and an error to that effect is issued.

Otherwise, the connection attempt succeeds and the security controller 122 sends 1408 a connected confirmation message to the authorized user device 140.

At this stage, the authorized user device 140 is connected and the unlock process begins 1419 by the authorized user device 140 sending 1420 an unlock request to security controller 122. The unlock request includes the unlocking public key associated with the private unlocking key stored on the authorized user device's secure hardware module. Security controller 122 matches 1421 the received unlocking public key against the unlocking public key 212 stored in the authorized user device metadata record 205. Next, security controller 122 generates 1422 a new blinding value (also referred to as unlock blinding key (UBK)), which essentially is an ephemeral private scalar and is generated randomly.

Security controller 122 then generates the challenge based on the identifier of the authorized user device (e.g., ephemeral public key 211) multiplied by the unlock blinding key (UBK). More particularly, security controller 122 multiplies 1423 the ephemeral public key 211 by the unlock blinding key, returning the full X and Y coordinates of the result, noting that this operation is performed on an elliptic curve. Security controller 122 then sends 1424 the X and Y coordinates to the authorized user device 140 as the challenge. It is noted here that this challenge is based on the identifier of the authorized user device 140 because the ephemeral public key is one factor of the multiplication resulting in the challenge. It is further noted that for each unlock request (i.e., 1420) a different unlock blinding key is generated to avoid man-in-the-middle attacks.

Further, security controller 122 computes 1425 the inverse of the unlock blinding key (UBK-1). The security controller 122 can compute the inverse of the unlock blinding key while waiting for a response from the authorized user device 140.

The authorized user device 140 calculates a response to the challenge by multiplying 1426 the challenge with the unlocking private key, which is stored in the authorized user device's secure hardware module and which corresponds to unlocking public key 212 stored on configuration memory 115. This may involve the execution of a cryptographic primitive that can be executed entirely within the secure hardware module within the authorized user device 140. Authorized user device 140 then sends back 1427 the result in a response message. Security controller 122 multiplies 1428 the returned result with the inverse of the unlock blinding key to compute the ephemeral unlock secret (EUS) 223.

In mathematical notation, P represents the ephemeral public key, and k represents the unlock blinding key created at step 1422 in FIG. 14. Security controller 122 calculates 1423 the product $k*P$ and sends 1424 it to the authorized user device 140. The authorized user device 140 multiplies 1426 the challenge with the unlocking private key j to calculate $j*k*P$ and returns 1427 the result to security controller 122. The security controller 122 multiplies this response with the inverse of the unlock blinding key k−1 to calculate $k^{-1}*j*k*P$ which is equal to $j*P$ due to commutative nature of elliptic curves (i.e., $k^{-1}*j*k*P=k*k^{-1}*j*P=j*P$).

Security controller 122 then uses $j*P$ as the ephemeral unlock secret (i.e., key) to decrypt 1429 user key. That is, security controller 122 uses the ephemeral unlock secret to decrypt the user key, stored on the DSD 100, which is encrypted with the ephemeral unlock secret. More particularly, security controller 122 decrypts 1429 the user key, which then decrypts 1430 a "user drive key", which is then, finally, sent 1431 to cryptography engine 106 via TCG commands. That is, the user drive key may be generated by security controller 122 using a key derivation function based on the user key. The user drive key is the TCG credential used to unlock the DSD 100 and may be equated to the "cryptographic key" described herein. In the case of Opal, this is the User2 credential.

It is noted that the ephemeral unlock secret is generated during the re-enrolment process by deriving a symmetric key from the result of an Elliptic Curve Diffie-Hellman process using the unlocking private key stored on the authorized user device 140 and the unlocking public key. The resulting key is used to encrypt the user key but not stored in DSD 100. Instead, it is re-generated each time an authorized user device requests to unlock the DSD 100, as described above.

In a further example, the unlocking private key j, in the equations above, can be replaced by a product of the unlocking private key with a value derived from a passphrase. The unlocking private key would still be stored in the secure hardware module of the authorized user device but the unlocking private key alone would not be able to decrypt the user content data stored on the DSD 100. Instead, the user needs to enter the passphrase to calculate the response to the challenge and send 1427 that response. This would simply replace j above with the product of j with the passphrase value. The DSD would be oblivious of that change because the ephemeral unlock secret would be generated in the same way as above from the view of the security controller 122.

It will be appreciated by persons skilled in the art that numerous variations and/or modifications may be made to the above-described embodiments, without departing from the broad general scope of the present disclosure. Furthermore, it will be appreciated by persons skilled in the art that embodiments disclosed herein can be combined with one or more other embodiment disclosed herein, without departing from the broad general scope of the present disclosure. The present embodiments are, therefore, to be considered in all respects as illustrative and not restrictive.

It will be appreciated by persons skilled in the art that any suitable distribution of functionality between different functional units may be used without detracting from the invention. For example, functionality illustrated to be performed by separate computing devices may be performed by the same computing device. Likewise, functionality illustrated to be performed by a single computing device may be distributed amongst several computing devices. Hence, references to specific functional units are only to be seen as references to suitable means for providing the described functionality, rather than indicative of a strict logical or physical structure or organization.

It will be appreciated by persons skilled in the art that, for processes and methods disclosed herein, the operations performed in the processes and methods may be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

References herein to software or executable instructions are to be understood as referring to executable instructions stored in volatile or non-volatile memory. The memory can include any data storage device that can store data which can thereafter be read by a processor. Examples of memory include read-only memory (ROM), random-access memory (RAM), magnetic tape, optical data storage device, flash storage devices, or any other suitable storage devices.

Throughout this specification the word 'comprise', or variations such as 'comprises' or 'comprising', will be understood to imply the inclusion of a stated element, integer or step, or group of elements, integers or steps, but not the exclusion of any other element, integer or step, or group of elements, integers or steps.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The invention claimed is:

1. A computer implemented method for transferring data from a user device to a non-volatile storage medium of a data storage device via a wireless peer-to-peer communication channel, the method performed by a software application executing on a user device, the user device comprising a user interface and memory store, the method comprising;
    establishing a control channel between the user device and the data storage device, the control channel comprising the wireless peer-to-peer communication channel; and
    in response to receiving from a user, via the user interface, a request to transfer data from the user device to the storage medium of the data storage device,
        sending, to the data storage device, via the control channel, a command to enable control channel access,
        performing a secure unlocking process to transition the data storage device to a control channel access state, and
        in response to successfully completing the secure unlocking process,
            obtaining write data to be written to the storage medium, and
            sending, to the data storage device, via the control channel, a write command comprising the write data.

2. The method of claim 1, wherein the software application comprises an operating system of the user device, and the method further comprises registering the data storage device as a block storage device with the operating system of the user device.

3. The method of claim 1, further comprising:
    establishing a peripheral control channel between the user device and a peripheral device, the peripheral control channel comprising a wireless peer-to-peer communication channel; and
    receiving, from the peripheral device, via the peripheral control channel, the write data.

4. The method of claim 3, wherein the software application comprises a peripheral device application configured to communicate with the peripheral device, via the peripheral control channel.

5. The method of claim 4, wherein obtaining the write data to be written to the storage medium comprises receiving, by the peripheral device application, from the peripheral device, via the peripheral control channel, the write data.

6. The method of claim 5, wherein the peripheral device application is configured to store a copy of the write data in the memory store of the user device.

7. The method of claim 6, wherein the peripheral device application is configured to, in response to sending, to the data storage device, via the control channel, a write command comprising the write data,
  erase the copy of the write data from the memory store of the user device.

8. The method of claim 1, wherein:
  the request to transfer data comprises a request to transfer the write data from a second data storage device to the data storage device; and
  the method further comprises transferring the write data from the second data storage device to the user device prior to sending the write command comprising the write data to the data storage device.

9. The method of claim 1, wherein the data storage device comprises a first data storage device and the control channel comprises a first control channel.

10. The method of claim 9, further comprising:
  establishing a second control channel between the user device and a second data storage device, the second control channel comprising a wireless peer-to-peer communication channel;
  sending, to the second data storage device, via the second control channel, a command to enable control channel access;
  performing a second secure unlocking process to transition the second data storage device to a control channel access state; and
  in response to successfully completing the second secure unlocking process:
    sending, to the second data storage device, via the second control channel, a read command, the read command comprising a reference to read data stored in a storage medium of the second data storage device; and
    receiving, from the second data storage device, via the second control channel, the read data.

11. The method of claim 10, further comprising, writing the read data, to a memory store of the user device, as the write data.

12. The method of claim 10, further comprising, in response to sending, to the data storage device, via the first control channel, a write command comprising the write data,
  erasing the write data from the memory store of the user device.

13. The method of claim 10, further comprising:
  obtaining, from the first data storage device, an indication of a first file structure, the first file structure comprising zero or more files; and
  obtaining, from the second data storage device, an indication of a second file structure, the second file structure comprising at least one file.

14. The method of claim 13, further comprising:
  displaying, on the user interface of the user device, a representation of the first file structure and a representation of the second file structure.

15. The method of claim 14, wherein obtaining write data to be written to the storage medium comprises:
  receiving, via the user interface, a user selection of a selected file in the second file structure;
  sending, to the second data storage device, via the second control channel, a read command, the read command comprising a reference to the selected file; and
  receiving, from the second data storage device, via the second control channel, the selected file.

16. The method of claim 1, wherein the write data comprises one or more files.

17. The method of claim 1, wherein the secure unlocking process comprises:
  receiving, from the data storage device, via the control channel, a cryptographic challenge;
  determining a response to the cryptographic challenge; and
  transmitting, to the user device, via the control channel, the cryptographic challenge.

18. The method of claim 17, wherein the cryptographic challenge is based on elliptic curve cryptography.

19. A device for transferring data to a non-volatile storage medium of a data storage device via a wireless peer-to-peer communication channel, the device comprising:
  a user interface;
  a memory store; and
  one or more processors configured to:
    establish a control channel between the device and the data storage device, the control channel comprising the wireless peer-to-peer communication channel; and
    in response to receiving from a user, via the user interface, a request to transfer data from the device to the storage medium of the data storage device:
      send, to the data storage device, via the control channel, a command to enable control channel access;
      perform a secure unlocking process to transition the data storage device to a control channel access state; and
      in response to successfully completing the secure unlocking process,
        obtain write data to be written to the storage medium, and
        send, to the data storage device, via the control channel, a write command comprising the write data.

20. A device for transferring data to a non-volatile storage medium of a data storage device via a wireless peer-to-peer communication channel, the device comprising:
  a user interface;
  a memory store;
  means to establish a control channel between the device and the data storage device, the control channel comprising the wireless peer-to-peer communication channel;
  means to, in response to receiving from a user, via the user interface, a request to transfer data from the device to the storage medium of the data storage device,
    send, to the data storage device, via the control channel, a command to enable control channel access, and
    perform a secure unlocking process to transition the data storage device to a control channel access state; and means to, in response to successfully completing the secure unlocking process, obtain write data to be written to the storage medium, and send, to the data storage device, via the control channel, a write command comprising the write data.

\* \* \* \* \*